United States Patent
Namie et al.

(10) Patent No.: US 10,354,683 B2
(45) Date of Patent: Jul. 16, 2019

(54) SERVO CONTROL METHOD HAVING FIRST AND SECOND TRAJECTORY GENERATION UNITS

(71) Applicant: OMRON Corporation, Kyoto (JP)

(72) Inventors: Masaki Namie, Takatsuki (JP); Yukio Iname, Kyoto (JP); Mikiko Manabe, Takatsuki (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/894,958

(22) Filed: Feb. 13, 2018

(65) Prior Publication Data

US 2019/0027170 A1 Jan. 24, 2019

(30) Foreign Application Priority Data

Jul. 19, 2017 (JP) .................. 2017-139648

(51) Int. Cl.
| | | |
|---|---|---|
| *G05B 13/04* | (2006.01) | |
| *G11B 5/596* | (2006.01) | |
| *G05B 19/408* | (2006.01) | |
| *G05B 19/4103* | (2006.01) | |

(52) U.S. Cl.
CPC ........ *G11B 5/59627* (2013.01); *G05B 13/048* (2013.01); *G05B 19/4086* (2013.01); *G05B 19/4103* (2013.01); *G05B 2219/41149* (2013.01); *G05B 2219/41195* (2013.01); *G05B 2219/42058* (2013.01); *G05B 2219/42209* (2013.01)

(58) Field of Classification Search
None
See application file for complete search history.

(56) References Cited

U.S. PATENT DOCUMENTS

| | | | | |
|---|---|---|---|---|
| 9,604,359 | B1* | 3/2017 | Grotmol | B25J 9/163 |
| 2006/0082340 | A1* | 4/2006 | Watanabe | B25J 9/163 |
| | | | | 318/568.21 |
| 2009/0125146 | A1* | 5/2009 | Zhang | B25J 9/1664 |
| | | | | 700/253 |
| 2011/0208356 | A1* | 8/2011 | Kato | B25J 9/163 |
| | | | | 700/253 |
| 2012/0095599 | A1* | 4/2012 | Pak | B25J 9/1664 |
| | | | | 700/275 |
| 2012/0158175 | A1* | 6/2012 | Lee | B62D 57/032 |
| | | | | 700/246 |

(Continued)

FOREIGN PATENT DOCUMENTS

| | | |
|---|---|---|
| EP | 3173883 | 5/2017 |
| WO | 2015125747 | 8/2015 |

OTHER PUBLICATIONS

Julius O. Smith III, "Forward-Backward Filtering", Introduction to Digital Filters with Audio Applications, Sep. 2007, pp. 1-2.

(Continued)

*Primary Examiner* — Tan X Dinh
(74) *Attorney, Agent, or Firm* — JCIPRNET

(57) ABSTRACT

A control device, a method of controlling the control device and recording medium are provided. Ranges of movement of a plurality of servo control systems are effectively used. A controller generates a corrected trajectory in which a high frequency component is removed from a first inverse kinematics trajectory so that no phase delay occurs as a command trajectory of a first servo control system.

7 Claims, 19 Drawing Sheets

(56) References Cited

U.S. PATENT DOCUMENTS

| | | | |
|---|---|---|---|
| 2013/0116820 A1* | 5/2013 | Lee | B62D 57/032 |
| | | | 700/254 |
| 2015/0148956 A1* | 5/2015 | Negishi | B25J 9/163 |
| | | | 700/253 |
| 2015/0241865 A1* | 8/2015 | Haghighat | G05B 19/195 |
| | | | 700/166 |

OTHER PUBLICATIONS

MATLAB, "Signal envelope", Sep. 24 2018, Available at: https://nl.mathworks.com/help/signal/ref/envelope.html.
"Search Report of Europe Counterpart Application", dated Oct. 8, 2018, p. 1-p. 8.

* cited by examiner

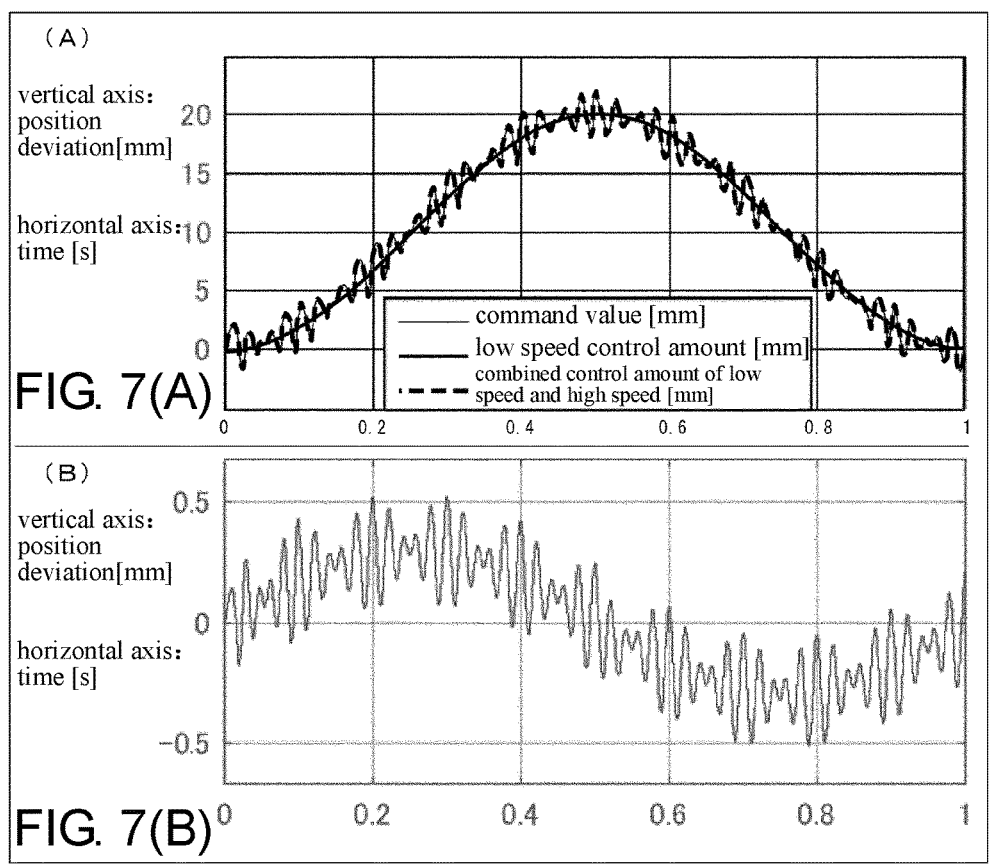

SERVO CONTROL METHOD HAVING FIRST AND SECOND TRAJECTORY GENERATION UNITS

CROSS-REFERENCE TO RELATED APPLICATION

This application claims the priority of Japan patent application serial no. 2017-139648, filed on Jul. 19, 2017. The entirety of the above-mentioned patent application is hereby incorporated by reference herein and made a part of this specification.

BACKGROUND

Technical Field

The disclosure relates to a control device configured to output a command value to a feedback control system such as a servo driver and the like.

Description of Related Art

There is a known control device through which, for a plurality of servo control systems, a command trajectory is generated for each of the servo control systems from a target trajectory, the command value generated from the command trajectory is output to the plurality of servo control systems for each of control periods, and the plurality of servo control systems are controlled in cooperation.

For example, Patent Document 1 listed below discloses a control device through which (1) a first trajectory generated when low pass filter processing is performed on a result of inverse kinematics calculation on a target trajectory is set as a command trajectory for a first servo control system, and (2) a command trajectory for a second servo control system is generated from an error between a result of direct kinematics calculation on the first trajectory and the target trajectory. Here, in the following description, reverse kinematics will be referred to as "inverse kinematics" and direct kinematics will be referred to as "forward kinematics."

PATENT DOCUMENTS

[Patent Document 1] United States Patent Application, Publication No. 2012/0095599 (published Apr. 19, 2012)

However, in the related art described above, according to the low pass filter processing in which a high frequency component is removed to improve adherence of the first servo control system, a phase lag (phase delay) is generated in the first trajectory, and the generated phase delay is compensated for in the second servo control system. That is, in the related art described above, instead of improving adherence of the first servo control system, a part of a trajectory that was initially intended to be realized by the first servo control system is realized in the second servo control system. Therefore, in the related art described above, there is a problem of a range of movement of the second servo control system not being effectively used.

SUMMARY

According to an embodiment of the disclosure, in a control device configured to control a plurality of servo control systems in cooperation, effectively use a range of movement of the plurality of servo control systems while maintaining adherence of the first servo control system.

A control device according to an embodiment of the disclosure includes a first trajectory generation unit configured to generate a first command trajectory in which a high frequency component is removed from a reference trajectory in a manner without occurring phase delay as a command trajectory of a first servo control system; and a second trajectory generation unit configured to generate a second command trajectory including a trajectory corresponding to the high frequency component as a command trajectory of a second servo control system.

A control method according to the disclosure includes a first trajectory generation step of generating a first command trajectory in which a high frequency component is removed from a reference trajectory in a manner without occurring phase delay as a command trajectory of a first servo control system; and a second trajectory generation step of generating a second command trajectory including a trajectory corresponding to the high frequency component as a command trajectory of a second servo control system.

BRIEF DESCRIPTION OF THE DRAWINGS

FIGS. 5(A) and 5(B) are diagrams showing details of a control test that is performed using the control system in FIG. 2 or the like.

FIGS. 7(A) and 7(B) are diagrams showing all positions and changes in position deviations of the first actuator and the second actuator controlled by the controller in FIG. 1 in the control test shown in FIGS. 5(A) and 5(B).

DESCRIPTION OF THE EMBODIMENTS

Figure 1:
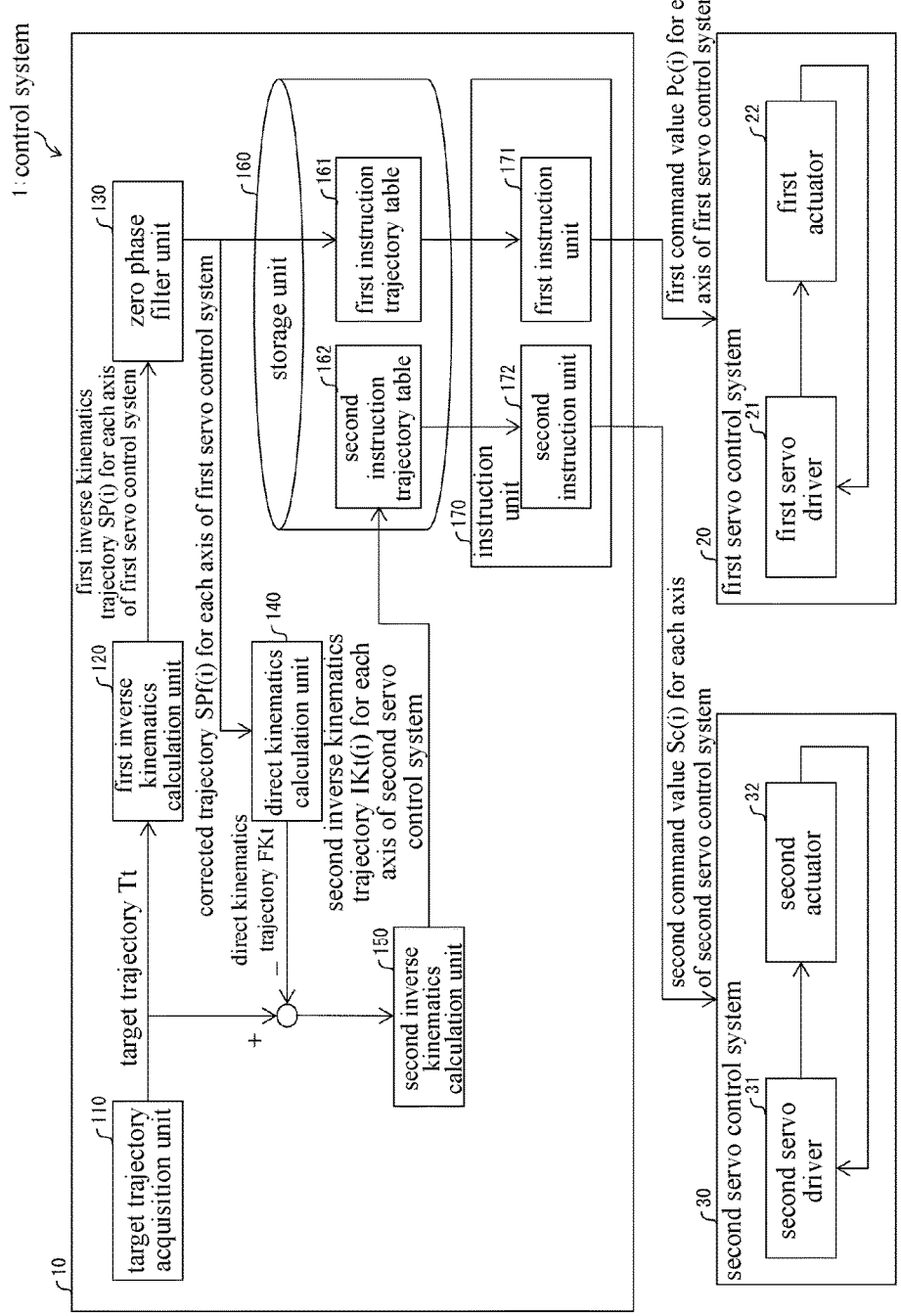
FIG. 1 is a block diagram showing a main part configuration and the like of a controller and the like according to Embodiment 1 of the disclosure.

According to the above configuration, the control device removes a high frequency component from the reference trajectory so that no phase delay occurs from the reference trajectory and generates the first command trajectory which is a command trajectory of the first servo control system.

Here, when a high frequency component is removed from the reference trajectory through a low pass filter, it is known that a phase lag (phase delay) occurs in the reference trajectory after the high frequency component is removed compared to the reference trajectory before the high frequency component is removed. Thus, the generated phase delay is compensated for in the second servo control system, that is, a part of a trajectory that was initially intended to be realized by the first servo control system is realized in the second servo control system, and it is not possible to effectively use a range of movement of the second servo control system.

On the other hand, since the control device removes a high frequency component from the reference trajectory so that no phase delay occurs from the reference trajectory and generates the first command trajectory, the first servo control system can sufficiently adhere to the first command trajectory after the high frequency component is removed. That is, the control device can maintain adherence of the first servo control system.

In addition, since the control device prevents the occurrence of a phase delay that is generated conventionally according to removal of the high frequency component, it is not necessary to compensate for a part of a trajectory that was initially intended to be realized by the first servo control system in the second servo control system. That is, the control device can effectively use a range of movement of the second servo control system.

As summarized above, the control device can effectively use a range of movement of the second servo control system by preventing the occurrence of a phase delay while maintaining adherence of the first servo control system according to removal of the high frequency component. Therefore, the control device has an effect that it is possible to maintain adherence of the first servo control system and it is possible to effectively use ranges of movement of the first servo control system and the second servo control system.

In the control device according to the disclosure, the first trajectory generation unit may perform low pass filter processing on the reference trajectory in both directions of a forward direction and a reverse direction of the time axis and generate the first command trajectory.

According to the above configuration, the control device performs low pass filter processing on the reference trajectory in both directions of a forward direction and a reverse direction of the time axis, removes a high frequency component from the reference trajectory so that no phase delay occurs from the reference trajectory, and generates the first command trajectory. That is, unlike a case in which low pass filter processing is performed on the reference trajectory, since the control device does not cause the occurrence of a phase delay, it is not necessary to compensate for a part of a trajectory that was initially intended to be realized by the first servo control system in the second servo control system.

Therefore, the control device can effectively use a range of movement of the second servo control system by preventing the occurrence of a phase delay while maintaining adherence of the first servo control system according to removal of the high frequency component. That is, the control device has an effect that it is possible to maintain adherence of the first servo control system and it is possible to effectively use ranges of movement of the first servo control system and the second servo control system.

In the control device according to the disclosure, the first trajectory generation unit may perform the low pass filter processing on the reference trajectory in order from a reverse direction to a forward direction of the time axis and generate the first command trajectory.

According to the above configuration, the control device performs the low pass filter processing on the reference trajectory in order from a reverse direction to a forward direction of the time axis and generates the first command trajectory.

Here, when the low pass filter processing is performed on the reference trajectory in order from a forward direction to a reverse direction of the time axis, a data jump occurs in the first command trajectory at a start time (at a time of t=0) with respect to the reference trajectory.

On the other hand, the control device performs the low pass filter processing on the reference trajectory in order from a reverse direction to a forward direction of the time axis and generates the first command trajectory. Therefore, the control device has an effect that it is possible to prevent the occurrence of a data jump in the first command trajectory at a start time (at a time of t=0) with respect to the reference trajectory.

In the control device according to the disclosure, the first trajectory generation unit may generated the first command trajectory from an average of upper and lower envelopes of a curve showing the reference trajectory.

According to the above configuration, the control device generates the first command trajectory from an average of upper and lower envelopes of a curve showing the reference trajectory, removes a high frequency component so that no phase delay occurs from the reference trajectory, and generates the first command trajectory. That is, the control device can effectively use a range of movement of the second servo control system by preventing the occurrence of a phase delay while maintaining adherence of the first servo control system according to removal of the high frequency component.

Therefore, the control device has an effect that it is possible to maintain adherence of the first servo control system and it is possible to effectively use ranges of movement of the first servo control system and the second servo control system.

The control device according to the disclosure may further include a prediction unit configured to predict a response of the first servo control system corresponding to the first command trajectory using a dynamic characteristics model of the first servo control system.

According to the above configuration, the control device predicts a response of the first servo control system corresponding to the first command trajectory using a dynamic characteristics model of the first servo control system.

Therefore, the control device has an effect that it is possible to predict a response of the first servo control system corresponding to the first command trajectory using a dynamic characteristics model of the first servo control system In the control device according to the disclosure, the prediction unit predicts a control amount which is an output of the first servo control system for a first command value generated from the first command trajectory using the dynamic characteristics model of the first servo control system, and the control device according to the disclosure may further include an instruction unit configured to output the first command value corrected according to model predictive control using a control amount predicted by the prediction unit and a measured value of a control amount of the first servo control system acquired as feedback information from the first servo control system to the first servo control system.

According to the above configuration, the control device outputs the first command value corrected according to model predictive control using a control amount predicted using a dynamic characteristics model of the first servo control system and a measured value of a control amount of the first servo control system to the first servo control system.

Therefore, the control device has an effect that it is possible to improve an adherence performance of the first servo control system with respect to the first command trajectory and additionally, it is possible to improve the adherence performance of both of the first servo control system and the second servo control system.

In the control device according to the disclosure, the second trajectory generation unit may generate the second command trajectory including a trajectory corresponding to an error between an intermediate trajectory and the reference trajectory, and wherein the intermediate trajectory is generated using a response of the first servo control system predicted by the prediction unit.

According to the above configuration, the control device generates the second command trajectory including a trajectory corresponding to an error between an intermediate trajectory generated using a response of the first servo control system predicted by the prediction unit and the reference trajectory.

Therefore, the control device has an effect that it is possible to compensate for a response delay of the first servo control system according to the second servo control system and it is possible to improve an adherence performance of both of the first servo control system and the second servo control system.

According to the control method, a high frequency component is removed from the reference trajectory so that no phase delay occurs from the reference trajectory and the first command trajectory which is a command trajectory of the first servo control system is generated.

Here, when a high frequency component is removed from the reference trajectory through a low pass filter, it is known that a phase lag occurs in the reference trajectory after the high frequency component is removed compared to the reference trajectory before the high frequency component is removed. Thus, the generated phase delay is compensated for in the second servo control system, that is, a part of a trajectory that was initially intended to be realized by the first servo control system is realized in the second servo control system, and it is not possible to effectively use a range of movement of the second servo control system.

On the other hand, in the control method, since a high frequency component is removed from the reference trajectory so that no phase delay occurs from the reference trajectory and the first command trajectory is generated, the first servo control system can sufficiently adhere to the first command trajectory after the high frequency component is removed. That is, in the control method, it is possible to maintain adherence of the first servo control system.

In addition, in the control method, since the occurrence of a phase delay that is generated conventionally is prevented according to removal of the high frequency component, it is not necessary to compensate for a part of a trajectory that was initially intended to be realized by the first servo control system in the second servo control system. That is, in the control method, it is possible to effectively use a range of movement of the second servo control system.

As summarized above, in the control method, it is possible to effectively use a range of movement of the second servo control system by preventing the occurrence of a phase delay while maintaining adherence of the first servo control system according to removal of the high frequency component. Therefore, the control method has an effect that it is possible to maintain adherence of the first servo control system and it is possible to effectively use ranges of movement of the first servo control system and the second servo control system.

According to an embodiment of the disclosure, there is an effect that, in a control device configured to control a plurality of servo control systems in cooperation, it is possible to effectively use a range of movement of the plurality of servo control systems while maintaining adherence of the first servo control system.

Embodiment 1

Embodiment 1 of the disclosure will be described below in detail with reference to FIG. 1 to FIGS. 7(A), 7(B), and FIGS. 18(A), 18(B) and FIGS. 19(A), 19(B). The same components or corresponding components in the drawings are denoted with the same reference numerals and descriptions thereof will not be repeated. In order to facilitate understanding of a controller 10 (control device) according to an embodiment of the disclosure, first, an overview of a control system 1 including the controller 10 will be described with reference to FIG. 2.

(Overview of Control System)

Figure 2:
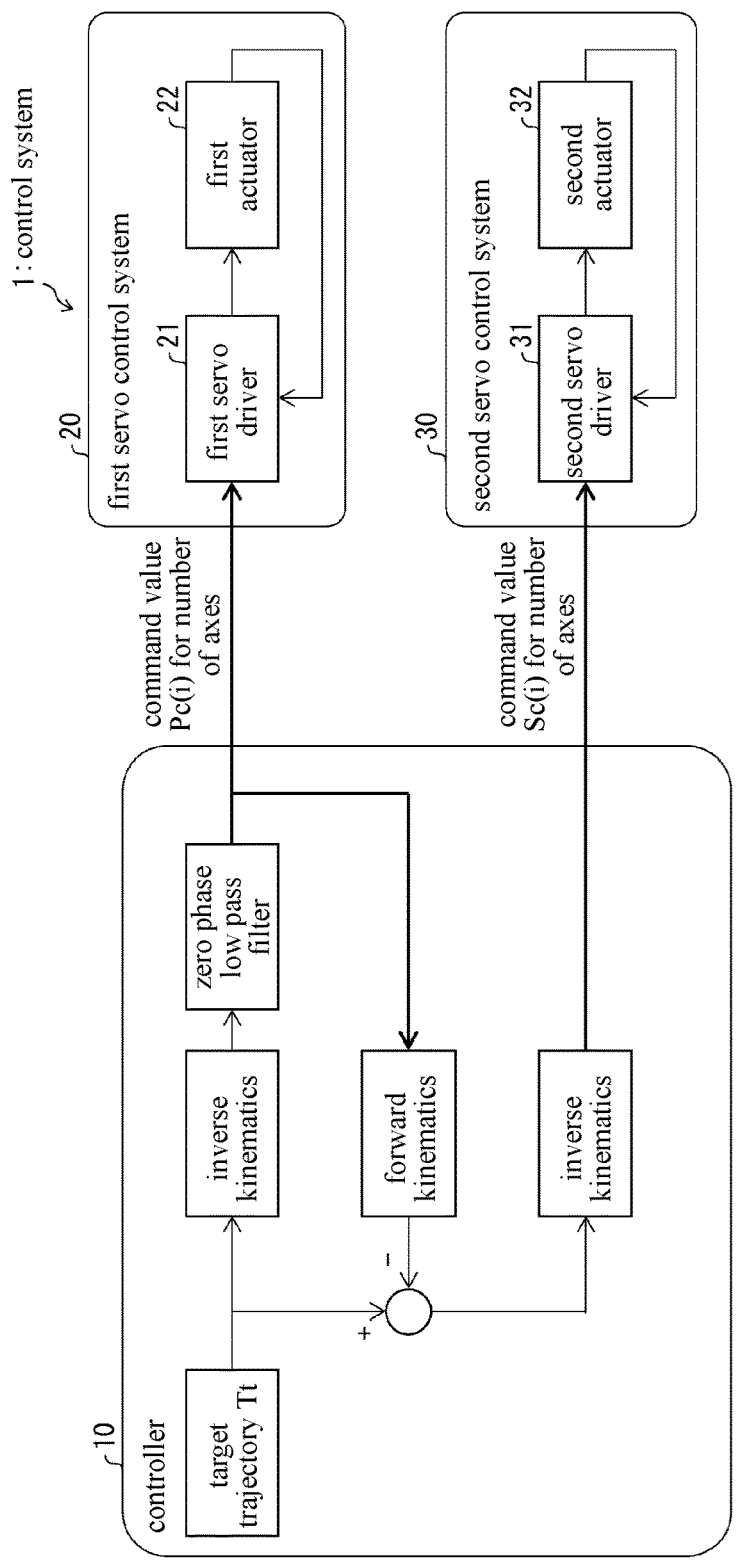
FIG. 2 is a diagram showing a general overview of a control system including the controller in FIG. 1.

FIG. 2 is a diagram showing an overview of the control system 1 including the controller 10. The control system 1 exemplified in FIG. 2 includes the controller 10 serving as a host controller and a first servo control system 20 and a second servo control system 30 that are controlled in cooperation by the controller 10. The first servo control system 20 is a feedback control system that includes a first servo driver 21 and a first actuator 22 whose driving is controlled by the first servo driver 21. Similarly, the second servo control system 30 is a feedback control system that includes a second servo driver 31 and a second actuator 32 whose driving is controlled by the second servo driver 31.

The controller 10 and each of the first servo driver 21 and the second servo driver 31 are communicatively connected and a connection method thereof is an arbitrary wired connection method or wireless connection method.

The first servo driver 21 receives a command value Pc(i) for each axis from the controller 10 and performs feedback control so that an output of the first actuator 22 as a control target for each axis (that is, a control amount for each axis) adheres to the command value Pc(i) for each axis. A control period of the first servo driver 21 is, for example, 1/12 ms.

The first actuator 22 is an actuator having a wider range of movement than the second actuator 32 and having a lower operation speed than the second actuator 32, and is, for example, a servomotor or a stepping motor. The first servo driver 21 drives the first actuator 22 according to the command value Pc from the controller 10. The first servo driver 21 sets the command value Pc from the controller 10 to a target value, sets a measured value as a feedback value, and performs feedback control on the first actuator 22. That is, the first servo driver 21 adjusts a current for driving the first actuator 22 so that the measured value approaches the target value. Here, the first servo driver 21 may be referred to as a servomotor amplifier.

The second servo driver 31 receives a command value Sc(i) for each axis from the controller 10 and performs feedback control so that an output of the second actuator 32 as a control target for each axis (that is, a control amount for each axis) adheres to the command value Sc(i) for each axis. A control period of the second servo driver 31 is, for example, 1/12 ms. However, a control period of 1/12 ms is only an example, and a control period of the second servo driver 31 may be shorter (control cycling may be faster), for example, 10 μs.

The second actuator 32 is an actuator that can operate at a higher speed than the first actuator 22 and has a narrower range of movement than the first actuator 22, and is, for example, a piezo actuator or a galvano scanner. The second servo driver 31 drives the second actuator 32 according to the command value Sc from the controller 10. The second servo driver 31 sets the command value Sc from the controller 10 as a target value and sets a measured value as a feedback value, and performs feedback control on the second actuator 32. That is, the second servo driver 31 adjusts a current for driving the second actuator 32 so that the measured value approaches the target value. Here, the second servo driver 31 may be referred to as a servomotor amplifier.

Here, as described above, the second actuator 32 can operate at a higher speed than the first actuator 22. In the following description, the second actuator 32 will be referred to as a "high speed actuator" and the first actuator 22 will be referred to as a "low speed actuator."

The controller 10 controls the entire control system 1 including the first servo control system 20 and the second servo control system 30, and is, for example, a programmable logic controller (PLC). Regarding the controller 10, (1) the controller 10 removes a high frequency component from a command trajectory of a low speed actuator (the first actuator 22) and thus improves adherence of the low speed actuator. In addition, (2) the controller 10 prevents a phase delay from occurring in the command trajectory of the low speed actuator and thus reduces an operation range of the high speed actuator (the second actuator 32). Specifically, the controller 10 performs the following (process 1) and (process 2), and thus controls the first servo control system 20 and the second servo control system 30 in cooperation.

(Process 1) The controller 10 generates a command trajectory using a target trajectory Tt for each of the first servo control system 20 and the second servo control system 30. Specifically, the controller 10 generates "a command trajectory of the first servo control system 20" and "a command trajectory of the second servo control system 30" from the target trajectory Tt using inverse kinematics calculation and direct kinematics calculation. That is, the controller 10 performs inverse kinematics calculation on the target trajectory Tt, removes a high frequency component from a generated first inverse kinematics trajectory SP(i) for each axis (not shown) of the first servo control system 20, and generates the corrected trajectory SPf(i) (not shown) as "a command trajectory of the first servo control system 20." Here, the first inverse kinematics trajectory SP(i) and the corrected trajectory SPf(i) which are not shown in FIG. 2 will be described below in detail with reference to FIG. 1 and the like.

In addition, the controller 10 generates a second inverse kinematics trajectory IKt(i) (not shown) generated when inverse kinematics calculation is performed on an error between a calculation result of direct kinematics calculation on "a command trajectory of the first servo control system 20" and the target trajectory Tt as "a command trajectory of the second servo control system 30." Here, similarly to the first inverse kinematics trajectory SP(i) and the corrected trajectory SPf(i), the second inverse kinematics trajectory IKt(i) which is not shown in FIG. 2 will be described below in detail with reference to FIG. 1 and the like.

Here, the controller 10 removes a high frequency component from the first inverse kinematics trajectory SP(i) so that no phase delay occurs, and generates the corrected trajectory SPf(i). Specifically, the controller 10 performs low pass filter processing on the first inverse kinematics trajectory SP(i) in both directions of a forward direction and a reverse direction of the time axis, that is, performs zero phase filter processing, and generates the corrected trajectory SPf(i). The controller 10 stores the generated corrected trajectory SPf(i) in a memory (specifically, a first instruction trajectory table 161 of a storage unit 160 to be described below).

(Process 2) The controller 10 generates command values (a first command value Pc(i) and a second command value Sc(i)) output to the first servo control system 20 and the second servo control system 30 from the command trajectories of the first servo control system 20 and the second servo control system 30. Specifically, the controller 10 generates the first command value Pc(i) from the corrected trajectory SPf(i) and generates the second command value Sc(i) from the second inverse kinematics trajectory IKt(i). The controller 10 outputs the first command value Pc(i) and the second command value Sc(i) to the first servo control system 20 and the second servo control system 30 for each control period of each of the first servo control system 20 and the second servo control system 30.

Here, a control period of the second servo control system 30 of the controller 10 is shorter (control cycling may be faster) than a control period of the first servo control system 20 of the controller 10. Specifically, the control period of the first servo control system 20 of the controller 10, that is, an update period of the first command value Pc(i) output from the controller 10 to the first servo driver 21 is, for example, 1 ms. In addition, a control period of the second servo control system 30 of the controller 10, that is, an update period of the second command value Sc(i) output from the controller 10 to the second servo driver 31 is, for example, 1/12 ms.

For example, the controller 10 outputs the first command value Pc(i) generated every 1 ms from the corrected trajectory SPf(i) to the first servo driver 21. In addition, for example, the controller 10 outputs the second command value Sc(i) generated every 1/12 ms from the second inverse kinematics trajectory IKt(i) to the second servo driver 31. Here, as described above, control periods of the first servo driver 21 and the second servo driver 31 are, for example, both $1/12$ ms. Therefore, the first servo driver 21 performs feedback control on the first actuator 22 with a control period of $1/12$ ms using the first command value Pc(i) updated every 1 ms by the controller 10. The second servo driver 31 performs feedback control on the second actuator 32 with a control period of $1/12$ ms using the second command value Sc(i) updated every $1/12$ ms by the controller 10.

Here, as described above, a control period of the second servo control system 30 of the controller 10 is shorter (control cycling may be faster) than a control period of the first servo control system 20 of the controller 10. Here, in the following description, the first servo control system 20 will be referred to as a "low speed servo control system (low speed servo system)", and the second servo control system 30 will be referred to as a "high speed servo control system (high speed servo system)."

In addition, in the following description, "inverse kinematics calculation" will be referred to as "inverse kinematics processing" and "direct kinematics calculation" will be referred to as "forward kinematics processing." In addition, when the first inverse kinematics trajectory SP, the corrected trajectory SPf, and the command value Pc are values for each "axis" of the first actuator 22, they are represented as the first inverse kinematics trajectory SP(i), the corrected trajectory SPf(i), and the command value Pc(i). The number of axes of the first actuator 22 is "1 to n," that is, "i=1 to n" for the command trajectory SP(i) and the command value Pc(i). Similarly, when the second inverse kinematics trajectory IKt and the command value Sc are values for each "axis" of the second actuator 32, they are represented as the second inverse kinematics trajectory IKt(i) and the command value Sc(i). The number of axes of the second actuator 32 is "1 to m," that is, "i=1 to m" for the second inverse kinematics trajectory IKt(i) and the command value Sc(i). When it is not necessary to separately describe the first inverse kinematics trajectory SP(i), the corrected trajectory SPf(i), the command value Pc(i), the second inverse kinematics trajectory IKt(i), and the command value Sc(i) for each axis as values, "(i)" may be omitted in some cases.

(Overview of Control Device)

Next, a configuration and details of processes of the controller 10 included in the control system 1 of which the overview has been described above with reference to FIG. 2 will be described with reference to FIG. 1 and the like. Before details are described with reference to FIG. 1, in order to facilitate understanding of the controller 10, the overview will be summarized as follows.

The controller 10 includes a zero phase filter unit 130 (first trajectory generation unit) that generates a corrected trajectory SPf (first command trajectory) in which a high frequency component is removed from the first inverse kinematics trajectory SP (reference trajectory) so that no phase delay occurs as a command trajectory of the first servo control system 20 and a second inverse kinematics calculation unit 150 (second trajectory generation unit) configured to generate a second inverse kinematics trajectory IKt (second command trajectory) including a trajectory corresponding to the high frequency component as a command trajectory of the second servo control system 30.

According to the above configuration, the controller 10 removes a high frequency component from first inverse kinematics trajectory SP so that a phase delay from the first inverse kinematics trajectory SP does not occur and generates the corrected trajectory SPf which is "a command trajectory of the first servo control system 20."

Here, when a high frequency component is removed from the first inverse kinematics trajectory SP using a low pass filter, it is known that a phase lag (phase delay) occurs in the first inverse kinematics trajectory SP after the high frequency component is removed compared to the first inverse kinematics trajectory SP before the high frequency component is removed. Thus, the generated phase delay is compensated for in the second servo control system 30, that is, a part of a trajectory that was initially intended to be realized by the first servo control system 20 is realized in the second servo control system 30, and it is not possible to effectively use a range of movement of the second servo control system 30.

On the other hand, the controller 10 removes a high frequency component from the first inverse kinematics trajectory SP so that no phase delay occurs from the first inverse kinematics trajectory SP and generates the corrected trajectory SPf. Therefore, the first servo control system 20 can sufficiently adhere to the corrected trajectory SPf after the high frequency component is removed. That is, the controller 10 can maintain adherence of the first servo control system 20.

In addition, since the controller 10 prevents the occurrence of a phase delay that is generated conventionally according to removal of the high frequency component, it is not necessary to compensate for a part of a trajectory that was initially intended to be realized by the first servo control system 20 in the second servo control system 30. That is, the controller 10 can effectively use a range of movement of the second servo control system 30.

As summarized above, the controller 10 can maintain adherence of the first servo control system 20 according to removal of the high frequency component and effectively use a range of movement of the second servo control system 30 by preventing the occurrence of a phase delay. Therefore, the controller 10 has an effect that it is possible to maintain adherence of the first servo control system 20 and it is possible to effectively use ranges of movement of the first servo control system 20 and the second servo control system 30.

In the controller 10, the zero phase filter unit 130 performs low pass filter processing on the first inverse kinematics trajectory SP in both directions of a forward direction and a reverse direction of the time axis and generates the corrected trajectory SPf.

According to the above configuration, the controller 10 performs low pass filter processing on the first inverse kinematics trajectory SP in both directions of a forward direction and a reverse direction of the time axis, and thus generates a corrected trajectory SPf in which a high frequency component is removed from the first inverse kinematics trajectory SP so that a phase delay from the first inverse kinematics trajectory SP does not occur. That is, unlike a case in which low pass filter processing is performed on the first inverse kinematics trajectory SP, since the controller 10 does not cause the occurrence of a phase delay in the trajectory of the first servo control system 20, it is not necessary to compensate for a part of a trajectory that was initially intended to be realized by the first servo control system in the second servo control system.

Therefore, the controller 10 can maintain adherence of the first servo control system 20 according to removal of the high frequency component and effectively use a range of movement of the second servo control system 30 by preventing the occurrence of a phase delay. That is, the controller 10 has an effect that it is possible to maintain adherence of the first servo control system 20 and it is possible to effectively use ranges of movement of the first servo control system 20 and the second servo control system 30.

In the controller 10, the zero phase filter unit 130 performs the low pass filter processing on the first inverse kinematics trajectory SP in order from a reverse direction to a forward direction of the time axis and generates the corrected trajectory SPf.

According to the above configuration, the controller 10 performs the low pass filter processing on the first inverse kinematics trajectory SP in order from a reverse direction to a forward direction of the time axis and generates the corrected trajectory SPf.

Here, as will be described below in detail with reference to FIGS. 4(A)~4(C), when the low pass filter processing is performed on the first inverse kinematics trajectory SP in order from a forward direction to a reverse direction of the time axis, a data jump occurs in the corrected trajectory SPf at a start time (at a time of t=0) with respect to the first inverse kinematics trajectory SP.

On the other hand, the controller 10 performs the low pass filter processing on the first inverse kinematics trajectory SP in order from a reverse direction to a forward direction of the time axis and generates the corrected trajectory SPf. Therefore, the controller 10 has an effect that it is possible to prevent the occurrence of a data jump in the corrected trajectory SPf at a start time (at a time of t=0) with respect to the first inverse kinematics trajectory SP.

To summarize the above, the controller 10 generates a trajectory that is obtained by performing low pass filter processing with delay compensation on a trajectory generated by performing inverse kinematics calculation on the target trajectory Tt as a command trajectory of the first actuator 22. Specifically, in the controller 10, a zero phase filter is used. The zero phase filter cancels out a phase lag (phase delay) by performing filter processing twice (one round trip) in a forward direction and a reverse direction of the time axis. In addition, the controller 10 performs zero phase filter processing in order from a reverse direction to a forward direction in order to remove a data jump at a start.

The controller 10 can reduce an operation range of a high speed actuator (the second actuator 32) by reducing a phase lag (phase delay) in the trajectory (command trajectory) of the low speed actuator (the first actuator 22). Therefore, the controller 10 can support a higher speed trajectory. In addition, the controller 10 can improve adherence of the low speed actuator by strengthening an effect of the low pass filter and improve control accuracy overall (both of the first servo control system 20 and the second servo control system 30). In addition, the controller 10 can expand options for the high speed actuator used in the control system 1 and can facilitate selection of a high speed actuator to be used. Next, a configuration and the like of the controller 10 of which the overview has been summarized above will be described in detail with reference to FIG. 1 and the like.

(Details of Control Device)

FIG. 1 is a block diagram showing a main part configuration of the controller 10 according to Embodiment 1 of the disclosure. As shown in FIG. 1, the controller 10 includes a target trajectory acquisition unit 110, a first inverse kinematics calculation unit 120, the zero phase filter unit 130, a direct kinematics calculation unit 140, the second inverse kinematics calculation unit 150, the storage unit 160, and an instruction unit 170 as functional blocks. Here, in order to secure simplicity of description, components that are not directly related to the present embodiment are omitted in the description and the block diagram. However, according to actual circumstances of realization, the controller 10 may include the omitted components. The functional blocks shown in FIG. 1 can be realized when, for example, a central processing unit (CPU) reads and executes a program stored in a storage device (the storage unit 160) realized by a read only memory (ROM), a non-volatile random access memory (NVRAM), or the like in a random access memory (RAM, not shown). The functional blocks in the controller 10 will be described below.

(Details of Functional Blocks Other than Storage Unit)

The target trajectory acquisition unit 110 receives target trajectory data (the target trajectory Tt) from the outside (for example, a user) and outputs the received target trajectory Tt to the first inverse kinematics calculation unit 120 and the second inverse kinematics calculation unit 150.

The first inverse kinematics calculation unit 120 performs inverse kinematics calculation of the target trajectory Tt acquired from the target trajectory acquisition unit 110 and generates the first inverse kinematics trajectory SP(i) for each axis of the first servo control system 20. The first inverse kinematics calculation unit 120 outputs the generated first inverse kinematics trajectory SP(i) to the zero phase filter unit 130.

The zero phase filter unit 130 removes a high frequency component from the first inverse kinematics trajectory SP(i) acquired from the first inverse kinematics calculation unit 120 so that no phase delay occurs and generates the corrected trajectory SPf(i) for each axis of the first servo control system 20. Specifically, the zero phase filter unit 130 performs zero phase filter processing on the first inverse kinematics trajectory SP(i) and generates the corrected trajectory SPf(i).

Here, in the zero phase filter processing, filter processing (low pass filter processing in the present embodiment) is performed in both directions of a forward direction and a reverse direction (for example, once each in a forward direction and a reverse direction of the time axis, and therefore twice in total). Specifically, low pass filter processing that is performed on the first inverse kinematics trajectory SP(i) in both directions of a forward direction and a reverse direction of the time axis will be referred to as "zero phase filter processing." Here, the low pass filter processing will be referred to as low pass filtering and zero phase filter processing will be referred to as zero phase filtering.

In particular, the zero phase filter unit 130 performs low pass filter processing on the first inverse kinematics trajectory SP(i) in order from a reverse direction to a forward direction of the time axis, that is, performs zero phase filter processing in a reverse direction (reverse order) on the time axis, and generates the corrected trajectory SPf(i). When low pass filter processing is performed in order from a reverse direction to a forward direction of the time axis, the zero phase filter unit 130 can generate a corrected trajectory SPf(i) with no data jump with respect to the first inverse kinematics trajectory SP(i) at a start time (at a time of t=0). A filter type of the low pass filter (zero phase filter) used in the zero phase filter unit 130, may be for example, a second-order Butterworth type with a cutoff frequency of 10 Hz. The zero phase filter processing performed by the zero phase filter unit 130 will be described below in detail with reference to FIGS. 4(A)~4(C).

The zero phase filter unit 130 stores the generated corrected trajectory SPf(i) as "a command trajectory of the first servo control system 20" in the first instruction trajectory table 161 of the storage unit 160. In addition, the zero phase filter unit 130 outputs the generated corrected trajectory SPf(i) to the direct kinematics calculation unit 140.

The zero phase filter unit 130 computes a trajectory in advance offline and stores the computed trajectory result in a memory. That is, the zero phase filter unit 130 stores the corrected trajectory SPf(i) that is generated by performing zero phase filter processing on the first inverse kinematics trajectory SP(i) in the first instruction trajectory table 161.

The direct kinematics calculation unit 140 generates a direct kinematics trajectory FKt (intermediate trajectory) from direct kinematics calculation for all of the corrected trajectories SPf(i) ("i=1 to n") acquired from the zero phase filter unit 130. The direct kinematics calculation unit 140 outputs the generated direct kinematics trajectory FKt to the second inverse kinematics calculation unit 150.

The second inverse kinematics calculation unit 150 generates a second inverse kinematics trajectory IKt (second command trajectory) including a trajectory corresponding to a high frequency component that is removed from the first inverse kinematics trajectory SP(i) by the zero phase filter unit 130 as "a command trajectory of the second servo control system 30."

Specifically, the second inverse kinematics calculation unit 150 generates a second inverse kinematics trajectory IKt including a trajectory corresponding to an error between the first inverse kinematics trajectory SP and the corrected trajectory SPf so that "a combined trajectory of the corrected trajectory SPf and the second inverse kinematics trajectory IKt matches the target trajectory Tt." The second inverse kinematics calculation unit 150 generates a second inverse kinematics trajectory IKt (second command trajectory) including a trajectory corresponding to a high frequency component removed from the first inverse kinematics trajectory SP(i) by the zero phase filter unit 130 as "a command trajectory of the second servo control system 30." For example, the second inverse kinematics calculation unit 150 may perform inverse kinematics calculation on an "an error between the direct kinematics trajectory FKt acquired from the direct kinematics calculation unit 140 and the target trajectory Tt" and generate a second inverse kinematics trajectory IKt(i) which is a command trajectory of the second servo control system 30 for each axis. The second inverse kinematics calculation unit 150 stores the generated second inverse kinematics trajectory IKt(i) as "a command trajectory of the second servo control system 30" in a second instruction trajectory table 162 of the storage unit 160.

The second inverse kinematics trajectory IKt (second command trajectory) which is a command trajectory of the second servo control system 30 includes a high frequency component that is removed from the first inverse kinematics trajectory SP(i) by the zero phase filter unit 130. In addition, the second inverse kinematics trajectory IKt (second command trajectory) satisfies a condition in which "a combined trajectory of a command trajectory (the corrected trajectory SPf) of the first servo control system 20 and a command trajectory (the second inverse kinematics trajectory IKt) of the second servo control system 30 matches the target trajectory Tt." That is, the second inverse kinematics calculation unit 150 may generate a second inverse kinematics trajectory IKt including a trajectory corresponding to an error between the first inverse kinematics trajectory SP and the corrected trajectory SPf so that "a combined trajectory of the corrected trajectory SPf and the second inverse kinematics trajectory IKt matches the target trajectory Tt."

The instruction unit 170 includes a first instruction unit 171 configured to output the first command value Pc(i) to the first servo control system 20 and a second instruction unit 172 configured to output the second command value Sc(i) to the second servo control system 30.

The first instruction unit 171 generates a first command value Pc(i) for each axis of the first servo control system 20 from "a command trajectory of the first servo control system 20" for each control period of the first servo control system 20 and outputs the generated first command value Pc(i) to the first servo control system 20. Specifically, the first instruction unit 171 refers to the first instruction trajectory table 161 of the storage unit 160 and acquires the corrected trajectory SPf(i) as "a command trajectory of the first servo control system 20." Then, the first instruction unit 171 generates a first command value Pc(i) for each axis of the first servo control system 20 from the corrected trajectory SPf(i), for example, every 1 ms, and outputs the generated first command value Pc(i) to the first servo control system 20.

The second instruction unit 172 generates a second command value Sc(i) for each axis of the second servo control system 30 from "a command trajectory of the second servo control system 30" for each control period of the second servo control system 30 and outputs the generated second command value Sc(i) to the second servo control system 30. Specifically, the second instruction unit 172 refers to the second instruction trajectory table 162 of the storage unit 160 and acquires the second inverse kinematics trajectory IKt(i) as "a command trajectory of the second servo control system 30." Then, the second instruction unit 172 generates a second command value Sc(i) for each axis of the second servo control system 30 from the second inverse kinematics trajectory IKt(i), for example, every $\frac{1}{12}$ ms, and outputs the generated second command value Sc(i) to the second servo control system 30.

(Details of Storage Unit)

The storage unit 160 is a storage device in which various types of data used by the controller 10 are stored. Here, the storage unit 160 may non-temporarily store (1) a control program executed by the controller 10, (2) an OS program, (3) an application program for executing various functions of the controller 10, and (4) various types of data to be read when the application program is executed. The above (1) to (4) data is stored in a non-volatile storage device, for example, a read only memory (ROM), a flash memory, an erasable programmable ROM (EPROM), an EEPROM (registered trademark) (electrically EPROM), and a hard disc drive (HDD). The controller 10 may include a temporary storage unit (not shown). The temporary storage unit is a so-called working memory in which data used for calculation, a calculation result, and the like during various processes performed by the controller 10 are temporarily stored, and includes a volatile storage device such as a random access memory (RAM). Which data is stored in which storage device is appropriately determined according to the usage purpose of the controller 10, convenience, cost, or physical restrictions. In the storage unit 160, additionally, the first instruction trajectory table 161 and the second instruction trajectory table 162 are stored. In the first instruction trajectory table 161, "a command trajectory of the first servo control system 20" is stored, and specifically, the corrected trajectory SPf(i) is stored by the zero phase filter unit 130. In the second instruction trajectory table 162, "a command trajectory of the second servo control system 30" is stored, and specifically, the second inverse kinematics trajectory IKt(i) is stored by the second inverse kinematics calculation unit 150.

The controller 10 creates the first instruction trajectory table 161 in advance according to an offline process, that is, calculates "a command trajectory of the first servo control system 20" in advance. The controller 10 may perform all processes offline and may create the second instruction trajectory table 162 in advance, that is, may calculate "a command trajectory of the second servo control system 30" in advance. Here, FIG. 1 shows an example in which the controller 10 performs all processes offline in advance and creates the second instruction trajectory table 162. However, it is not necessary for the controller 10 to calculate "a command trajectory of the second servo control system 30" in advance, that is, it is not necessary to create the second instruction trajectory table 162 in advance.

(Processes Performed by Controller)

Figure 3:
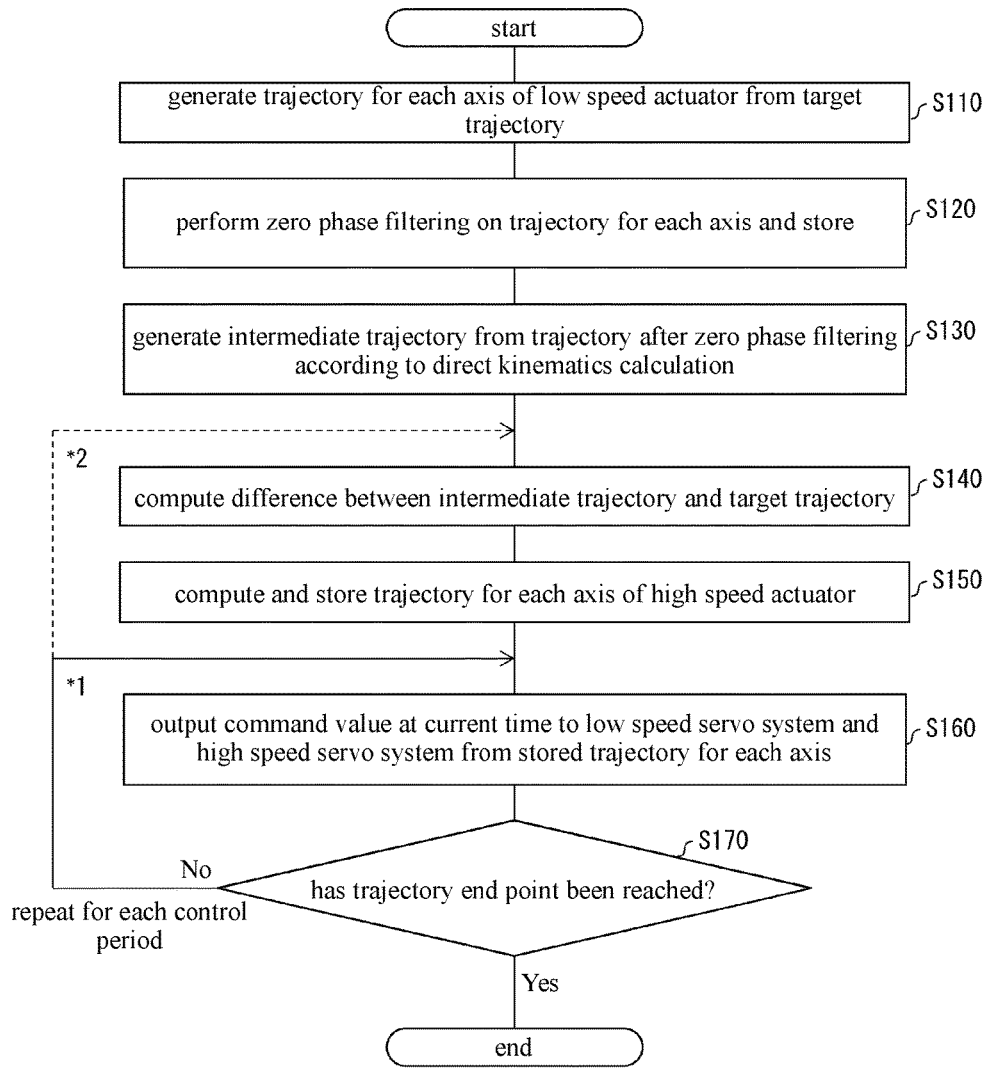
FIG. 3 is a flowchart showing an overview of processes performed by the controller in FIG. 1.

FIG. 3 is a flowchart showing an overview of processes performed by the controller 10. As shown in FIG. 3, the first inverse kinematics calculation unit 120 generates a trajectory for each axis of a low speed actuator (the first actuator 22) from the target trajectory Tt, that is, performs inverse kinematics calculation on the target trajectory Tt and generates the first inverse kinematics trajectory SP(i) (S110).

The zero phase filter unit 130 performs zero phase filtering on the trajectory for each axis (that is, the first inverse kinematics trajectory SP(i)) and stores the generated corrected trajectory SPf(i) in the first instruction trajectory table 161 of the storage unit 160 (S120).

The controller 10 computes a difference between the trajectory after zero phase filtering and the target trajectory Tt. Specifically, the direct kinematics calculation unit 140 generates an intermediate trajectory (that is, the direct kinematics trajectory FKt) from the trajectory after zero phase filtering (that is, the corrected trajectory SPf(i)) according to direct kinematics calculation (S130). Then, the second inverse kinematics calculation unit 150 computes a difference (error) between the intermediate trajectory and the target trajectory Tt (S140).

The second inverse kinematics calculation unit 150 computes a trajectory for each axis of the high speed actuator (the second actuator 32) using the computed error (difference) and stores it in the second instruction trajectory table 162 of the storage unit 160 (S150). Specifically, the second inverse kinematics calculation unit 150 performs inverse kinematics calculation on "an error between the intermediate trajectory (that is, the direct kinematics trajectory FKt) and the target trajectory Tt" and generates the second inverse kinematics trajectory IKt(i) which is a command trajectory for each axis of the second servo control system 30. Then, the second inverse kinematics calculation unit 150 stores the generated second inverse kinematics trajectory IKt(i) in the second instruction trajectory table 162 of the storage unit 160.

The second inverse kinematics calculation unit 150 generates a second inverse kinematics trajectory IKt including a trajectory corresponding to an error between the first inverse kinematics trajectory SP and the corrected trajectory SPf. Specifically, the second inverse kinematics calculation unit 150 generates a second inverse kinematics trajectory IKt including a trajectory corresponding to an error between the first inverse kinematics trajectory SP and the corrected trajectory SPf so that "a combined trajectory of the corrected trajectory SPf and the second inverse kinematics trajectory IKt matches the target trajectory Tt."

The instruction unit 170 outputs a command value at a current time to the low speed servo system (that is, the first servo control system 20) and the high speed servo system (that is, the second servo control system 30) from the stored trajectory for each axis (S160). Specifically, the first instruction unit 171 generates a first command value Pc(i) for each control period of the first servo control system 20 from the corrected trajectory SPf(i) stored in the first instruction trajectory table 161, and outputs the generated first command value Pc(i) to the first servo control system 20. In addition, the second instruction unit 172 generates a second command value Sc(i) for each control period of the second servo control system 30 from the second inverse kinematics trajectory IKt(i) stored in the second instruction trajectory table 162, and outputs the generated second command value Sc(i) to the second servo control system 30. The controller 10 repeats the processes of S140 to S160 or the process of S160 for each control period while determining whether a trajectory end point has been reached (S170). Specifically, the controller 10 repeats "a process related to only the first servo control system 20" among "the processes of S140 to S160 or the process of S160" with a control period of the first servo control system 20 while determining whether a trajectory end point has been reached (S170). In addition, the controller 10 repeats a process (for example, a process related to the second servo control system 30) other than "a process related to only the first servo control system 20" among "the processes of S140 to S160 or the process of S160" with a control period of the second servo control system 30 while determining whether a trajectory end point has been reached (S170).

The control method performed by the controller 10 described above can be summarized as follows. That is, the control method performed by the controller 10 includes a first trajectory generation step (S120) in which a corrected trajectory SPf in which a high frequency component is removed from the first inverse kinematics trajectory SP so that no phase delay occurs is set as "a command trajectory of the first servo control system 20" and a second trajectory generation step (S150) in which a second inverse kinematics trajectory IKt (second command trajectory) including a trajectory corresponding to the high frequency component is generated as "a command trajectory of the second servo control system 30."

According to the above method, in the control method, a high frequency component is removed from the first inverse kinematics trajectory SP so that a phase delay from the first inverse kinematics trajectory SP does not occur and a corrected trajectory SPf which is a command trajectory of the first servo control system 20 is generated.

Here, when a high frequency component is removed from the first inverse kinematics trajectory SP using a low pass filter, it is known that a phase lag (phase delay) occurs in the first inverse kinematics trajectory SP after the high frequency component is removed compared to the first inverse kinematics trajectory SP before the high frequency component is removed. Thus, the generated phase delay is compensated for in the second servo control system 30, that is, a part of a trajectory that was initially intended to be realized by the first servo control system 20 is realized in the second servo control system 30, and it is not possible to effectively use a range of movement of the second servo control system 30.

On the other hand, in the control method, a high frequency component is removed from the first inverse kinematics trajectory SP so that no phase delay occurs from the first inverse kinematics trajectory SP and a corrected trajectory SPf is generated. Therefore, the first servo control system 20 can sufficiently adhere to the corrected trajectory SPf after the high frequency component is removed. That is, in the control method, it is possible to maintain adherence of the first servo control system 20.

In addition, in the control method, since the occurrence of a phase delay that is generated conventionally is prevented according to removal of the high frequency component, it is not necessary to compensate for a part of a trajectory that was initially intended to be realized by the first servo control system 20 in the second servo control system 30. That is, in the control method, it is possible to effectively use a range of movement of the second servo control system 30.

As summarized above, in the control method, it is possible to maintain adherence of the first servo control system 20 according to removal of the high frequency component and effectively use a range of movement of the second servo control system 30 by preventing the occurrence of a phase delay. Therefore, the control method has an effect that it is possible to maintain adherence of the first servo control system 20 and it is possible to effectively use ranges of movement of the first servo control system 20 and the second servo control system 30.

(Zero Phase Filter Processing)

Here, zero phase filter processing (zero phase filtering) performed by the zero phase filter unit 130 will be described in detail. As described above, the zero phase filter unit 130 performs low pass filter processing on the first inverse kinematics trajectory SP(i) in order from a reverse direction to a forward direction of the time axis (that is, in a reverse direction (reverse order) on the time axis) and generates the corrected trajectory SPf(i).

The zero phase filter unit 130 obtains a coefficient of first-order delay filter computation in advance. Specifically, the zero phase filter unit 130 obtains "a=Ts/(T+Ts)" and "b=T/(T+Ts)" in advance. Here, Ts is a sampling period and T is a filter time constant.

The zero phase filter unit 130 creates temporary trajectory data SPr(i) in which the time axis is reversed in the first inverse kinematics trajectory SP(i), and obtains "SPr(i)=SP(n−i)." The zero phase filter unit 130 performs filtering computation (low pass filter processing) for the first time (in a reverse direction of the time axis), that is, obtains "SPfr(i)=a×SPr(i)+b×SPr(i−1)." However, "SPr(−1)=SPr(0)" is assumed.

The zero phase filter unit 130 reverses the time axis again and returns to its original time axis, that is, obtains "SPfn(i)=SPfr(n−i)." The zero phase filter unit 130 performs filtering computation for the second time (in a forward direction) and obtains a corrected trajectory SPf(i) after zero phase filtering. That is, the zero phase filter unit 130 obtains "SPf(i)=a×SPfn(i)+b×SPfn(i−1)." However, "SPf(i−1)=SP(0)" is assumed. Here, because "SPfn(−1)=SP(0)" is assumed rather than "SPfn(−1)=SPfn(0)," the zero phase filter unit 130 can prevent jump in SP at a start time.

The zero phase filter unit 130 performs zero phase filter processing in a reverse order of the time axis (that is, low pass filter processing is performed one round trip from a reverse direction to a forward direction of the time axis) and prevents the occurrence of data jump at a start time, which will be described with reference to FIGS. 4(A)–4(C).

(Method of Removing High Frequency Component)

Figures 4A, 4B, 4C:
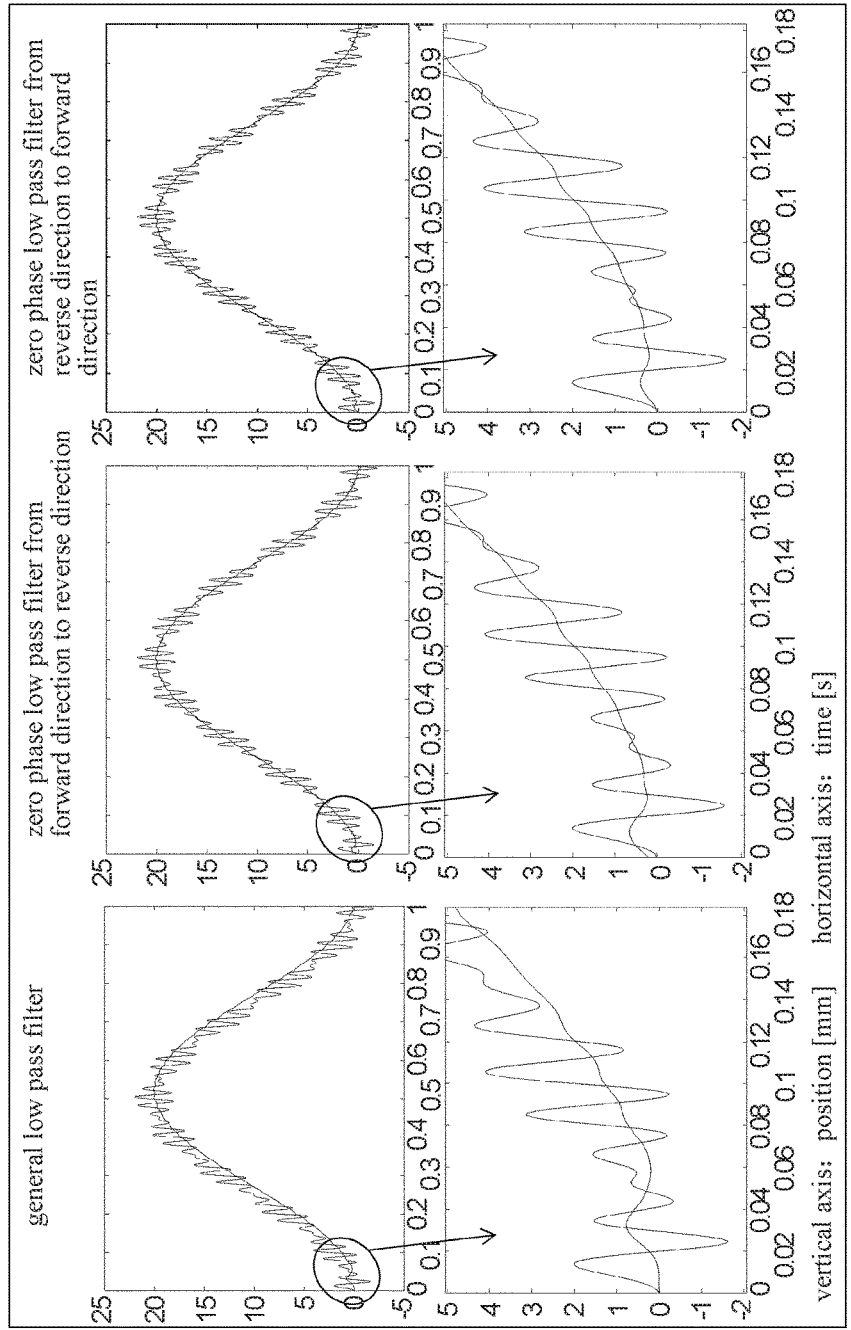
FIGS. 4(A)–4(C) are diagrams explaining a phase delay and a data jump generated according to a method of removing a high frequency component.

FIGS. 4(A)–4(C) are diagrams explaining a phase delay and a data jump generated in the corrected trajectory SPf(i) according to a method of removing a high frequency component from the first inverse kinematics trajectory SP(i). In FIGS. 4(A)–4(C), the vertical axis represents a position, and the horizontal axis represents a time (t). In FIGS. 4(A), 4(B), and 4(C), the vicinity of the start time (t=0) in the upper diagram is respectively enlarged to be shown as the lower diagram. FIG. 4(A) shows the first inverse kinematics trajectory SP(i) and the corrected trajectory SPf(i) when general low pass filter processing (low pass filtering) is performed on the first inverse kinematics trajectory SP(i). In FIG. 4(A), the low pass filter type is a fourth-order Butterworth type with a cutoff frequency of 10 Hz. FIG. 4(B) shows the first inverse kinematics trajectory SP(i) and the corrected trajectory SPf(i) when low pass filter processing is performed on the first inverse kinematics trajectory SP(i) from a forward direction to a reverse direction of the time axis one round trip. FIG. 4(C) shows the first inverse kinematics trajectory SP(i) and the corrected trajectory SPf(i) when low pass filter processing is performed on the first inverse kinematics trajectory SP(i) from a reverse direction to a forward direction of the time axis one round trip. In each of the FIGS. 4(B) and 4(C), a filter type of the zero phase filter is a second-order Butterworth type with a cutoff frequency of 10 Hz.

As shown in FIG. 4(A), when general low pass filter processing (filter processing) is performed, a phase lag (phase delay) from the first inverse kinematics trajectory SP(i) occurs in the corrected trajectory SPf(i) according to this filter processing.

On the other hand, as shown in FIGS. 4(B) and 4(C), when zero phase filter processing is performed, in other words, when "filter processing is performed once in both directions of a forward direction and a reverse direction of the time axis and therefore twice in total (performed one round trip)," it is possible to remove a phase lag.

However, when "filter processing is performed from a forward direction to a reverse direction of the time axis one round trip (that is, when filter processing is performed in order from a forward direction to a reverse direction of the time axis)," as shown in FIG. 4(B), a data jump occurs at a start time (t=0).

Therefore, when zero phase filter processing is performed in order "from a reverse direction to a forward direction of the time axis," in other words, when "filter processing is performed from a reverse direction to a forward direction of the time axis one round trip," it is possible to avoid a data jump at a start time. In FIG. 4(C), when zero phase filter processing is performed in order "from a reverse direction to a forward direction of the time axis," it is possible to avoid a data jump at a start time (t=0).

(Effects of Controller)

How the controller 10 actually controls the first actuator 22 and the second actuator 32 through the first servo driver 21 and the second servo driver 31 will be described with reference to FIGS. 5(A), 5(B) and the like.

Figures 5A, 5B:
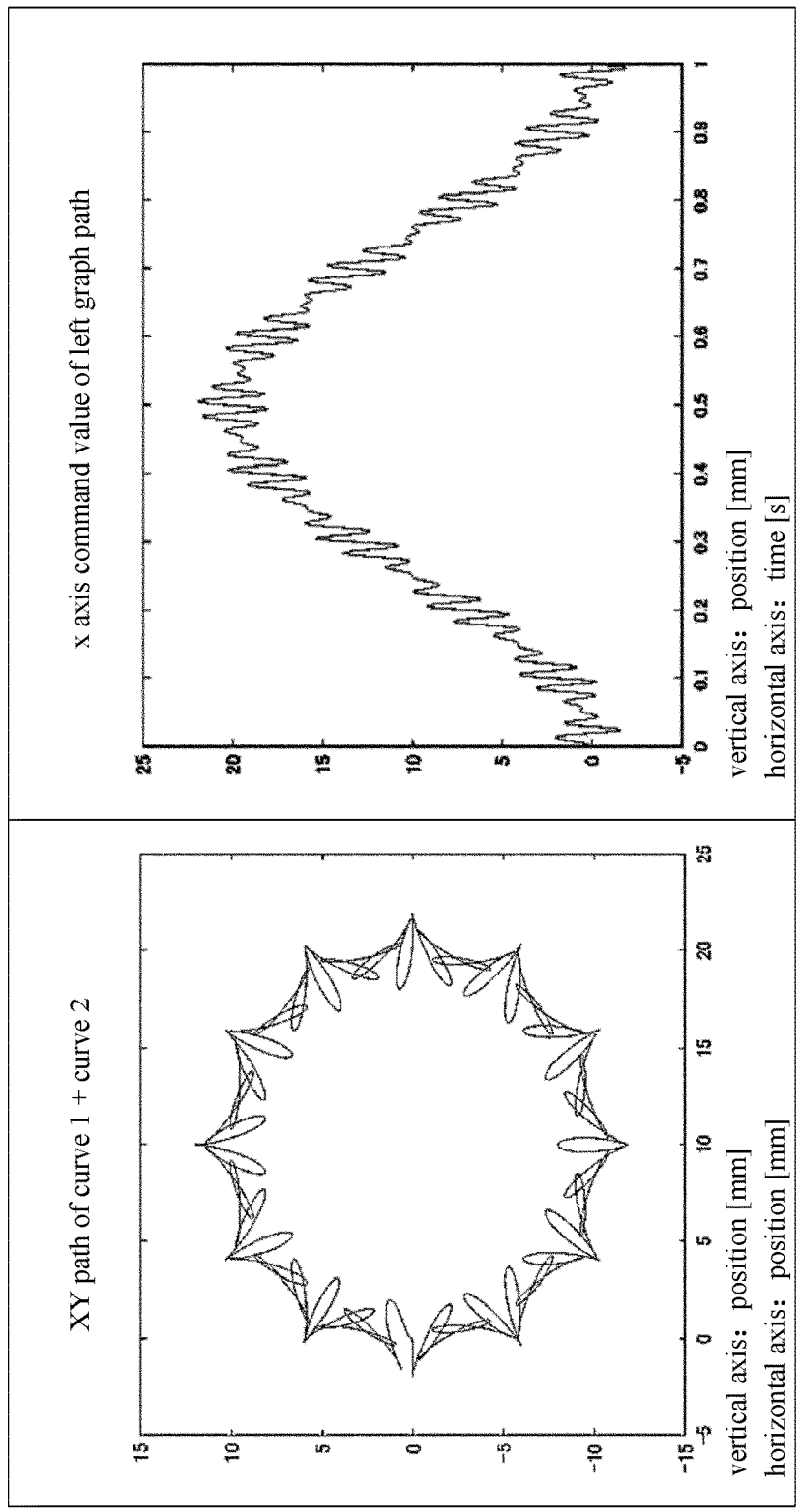

FIGS. 5(A) and 5(B) are diagrams showing details of a control test (control simulation) that is performed using the controller 10 in the control system 1. Control performance (position deviation) and the operation range of the second actuator 32 in an X axis component of a complex two-dimensional path are compared between the controller 10 and a conventional controller. Here, the "conventional controller" is a cooperative control controller that performs low pass filter processing on the first inverse kinematics trajectory SP(i) acquired from the first inverse kinematics calculation unit 120 and generates "a command trajectory of the first servo control system 20." That is, the controller 10 performs "zero phase filter processing" on the first inverse kinematics trajectory SP(i) and generates "a command trajectory of the first servo control system 20." On the other hand, the "conventional controller" performs "low pass filter processing" on the first inverse kinematics trajectory SP(i)

and generates "a command trajectory of the first servo control system 20." The other points are assumed to be the same between the controller 10 and the conventional controller.

The two-dimensional path used in the control test is obtained by combining the following two curves, a curve 1 and a curve 2, that is, "the curve 1: circle, 1 round in 1 second, a radius of 10 mm," and "the curve 2: folium of Descartes, 1 round in 0.1 seconds, the number of leaves 9, a length of the leaf of 2 mm. In FIG. 5(A), an XY path of the curve 1+the curve 2 is shown. In FIG. 5(A), the vertical axis represents a Y axis position and the horizontal axis represents an X axis position. In FIG. 5(B), an X axis command value of the XY path in FIG. 5(A) is shown. In FIG. 5(B), the vertical axis represents an X axis command value (position), and the horizontal axis represents a time (t). Here, acceleration is assumed to smoothly occur at a constant acceleration for 0.02 s immediately after starting.

Both the first actuator 22 and the second actuator 32 have two axes X and Y. Control periods of the first servo driver 21 and the second servo driver 31 are both $1/12$ ms. That is, a control period of the first actuator 22 of the first servo driver 21 is $1/12$ ms, and a control period of the second actuator 32 of the second servo driver 31 is $1/12$ ms. In addition, a control period of the controller 10, that is, an update period of a command value of each of the first servo driver 21 (the low speed servo control system) and the second servo driver 31 (the high speed servo control system) of the controller 10 is 1 ms on the low speed side and $1/12$ ms on the high speed side.

(Control of Position and the Like by Conventional Controller)

Figures 18A, 18B:
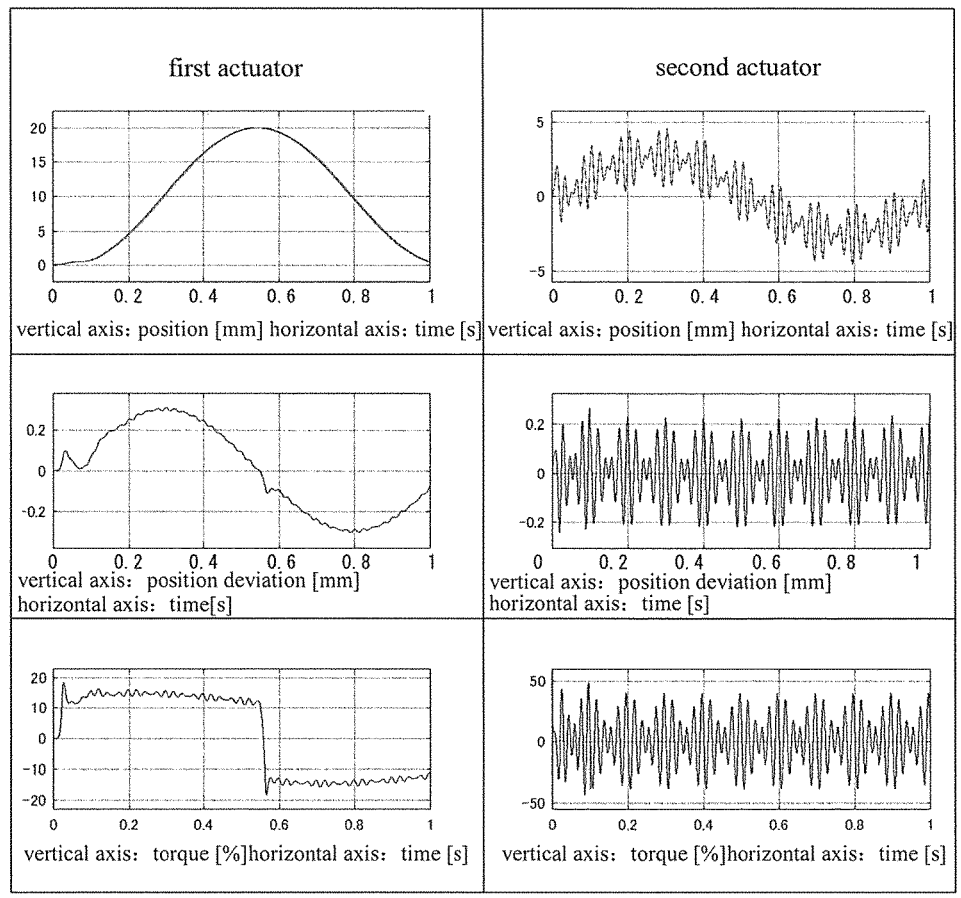
FIGS. 18(A) and 18(B) are diagrams showing changes in positions, position deviations, and torques of a first actuator and a second actuator controlled by a conventional cooperative control controller in the control test shown in FIGS. 5(A) and 5(B).

FIGS. 18(A) and 18(B) are diagrams showing changes in positions, position deviations, and torque in the first actuator 22 and the second actuator 32 controlled by a conventional controller in the control test shown in FIGS. 5(A) and 5(B). FIG. 18(A) shows changes in position, position deviation, and torque of the first actuator 22 controlled by the conventional controller in order from the top. FIG. 18(B) shows changes in position, position deviation, and torque of the second actuator 32 controlled by the conventional controller in order from the top. In all of the drawings shown in FIGS. 18(A) and 18(B), the horizontal axis represents a time (t).

Figure 19A:
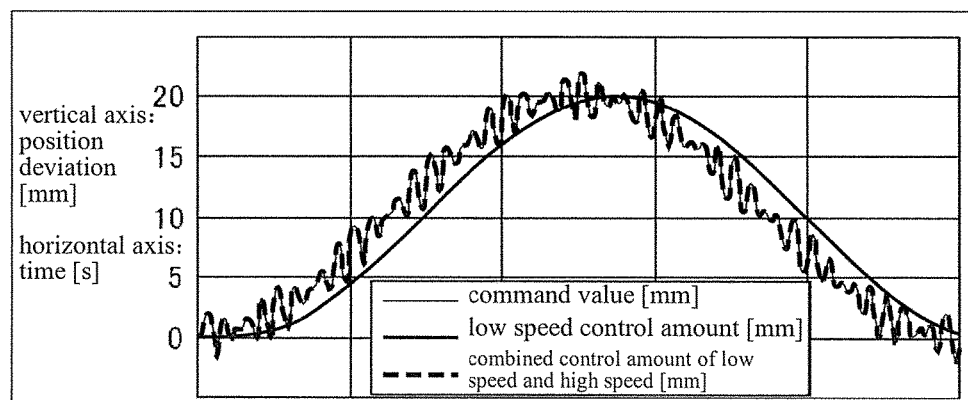
FIGS. 19(A) and 19(B) are diagrams showing all positions and changes in position deviations of the first actuator and the second actuator controlled by the conventional cooperative control controller in the control test shown in FIGS. 5(A) and 5(B).
Figure 19B:
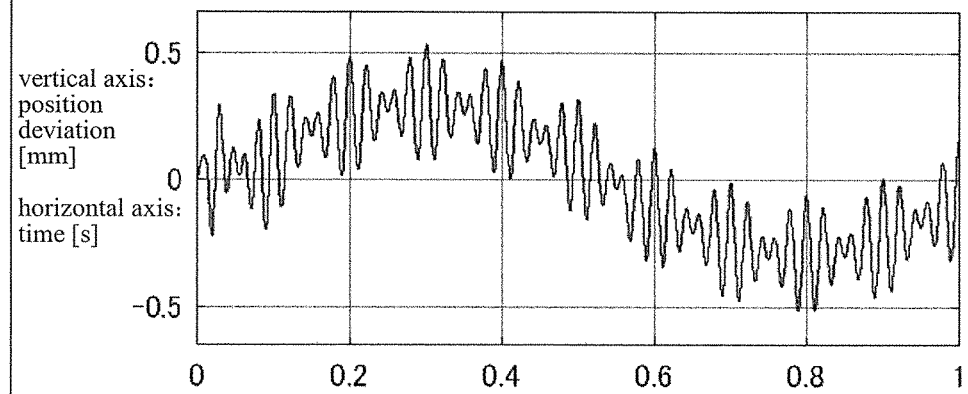

FIGS. 19(A) and 19(B) are diagrams showing all positions (FIG. 19(A)) and changes in position deviations (FIG. 19(B)) of the first actuator 22 and the second actuator 32 controlled by the conventional controller in the control test shown in FIGS. 5(A) and 5(B). In all of the drawings shown in FIG. 19, the horizontal axis represents a time (t). Here, in FIG. 19(A), a command value and a combined control amount of low speed and high speed (a value obtained by adding (combining) a measured value of a control amount of the first actuator 22 and a measured value of a control amount of the second actuator 32) almost overlap.

In the "conventional controller" whose results of the control test (control simulation) are shown in FIGS. 18(A), 18(B) and FIGS. 19(A), 19(B), the low pass filter type is a fourth-order Butterworth type with a cutoff frequency of 10 Hz. As described above, the "conventional controller" is the same as the controller 10 except that "low pass filter processing" is performed on the first inverse kinematics trajectory SP(i) in place of "zero phase filter processing," and "a command trajectory of the first servo control system 20" is generated. As shown in FIGS. 18(A), 18(B) and FIGS. 19(A), 19(B), when the "conventional controller" is used, the operation range of the high speed actuator (the second actuator 32) is about plus or minus 4.5 mm (a path shown in the top drawing in FIG. 18(B)). When the "conventional controller" is used, the operation range on the side of the high speed actuator increases by a phase lag (phase delay) according to "low pass filter processing."

(Control of Position and the Like by Controller 10)

Figures 6A, 6B:
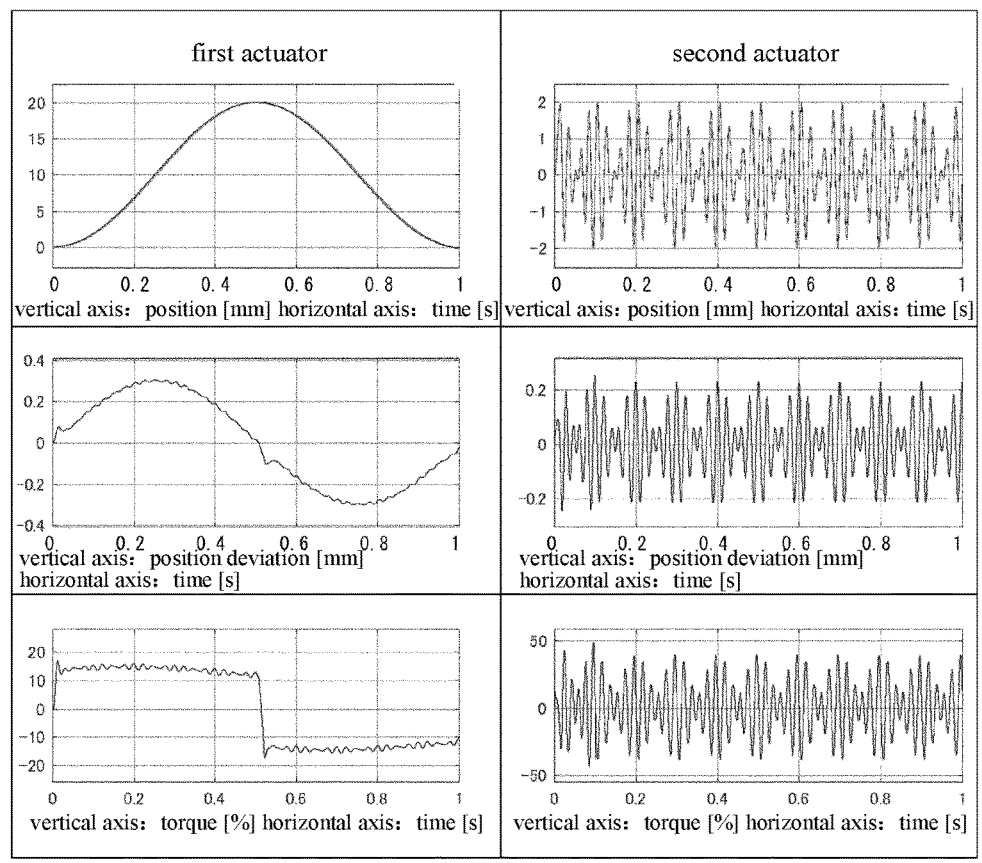
FIGS. 6(A) and 6(B) are diagrams showing changes in positions, position deviations, and torques of a first actuator and a second actuator controlled by the controller in FIG. 1 in the control test shown in FIGS. 5(A) and 5(B).

FIGS. 6(A) and 6(B) are diagrams showing changes in positions, position deviations, and torques of the first actuator 22 and the second actuator 32 controlled by the controller 10 in the control test shown in FIGS. 5(A) and 5(B). FIG. 6(A) shows changes in position, position deviation, and torque of the first actuator 22 controlled by the controller 10 in order from the top. FIG. 6(B) shows changes in position, position deviation, and torque of the second actuator 32 controlled by the controller 10 in order from the top. In all of the drawings shown in FIGS. 6(A) and 6(B), the horizontal axis represents a time (t).

FIGS. 7(A) and 7(B) are diagrams showing positions (FIG. 7(A)) and changes in position deviations (FIG. 7(B)) of both (all) of the first actuator 22 and the second actuator 32 controlled by the controller 10 in the control test shown in FIGS. 5(A) and 5(B). In all of the drawings shown in FIGS. 7(A) and 7(B), the horizontal axis represents a time (t). Here, in FIG. 7(A), a command value and a combined control amount of low speed and high speed (a value obtained by adding (combining) a measured value of a control amount of the first actuator 22 and a measured value of a control amount of the second actuator 32) almost overlap.

The controller 10 performs low pass filtering on the first inverse kinematics trajectory SP(i) in order "from a reverse direction to a forward direction of the time axis" one round trip and generates "a command trajectory of the first servo control system 20." That is, the controller 10 performs zero phase filter processing on the first inverse kinematics trajectory SP(i) in order "from a reverse direction to a forward direction of the time axis," and generates "a command trajectory of the first servo control system 20." The low pass filter type of the low pass filter used in the controller 10 is a second-order Butterworth type with a cutoff frequency of 10 Hz.

All deviations of the low speed actuator (the first actuator 22), the high speed actuator (the second actuator 32), and all thereof (both of the first actuator 22 and the second actuator 32) are the same as those of the "conventional controller."

However, when the controller 10 is used, as shown in FIGS. 6(A), 6(B) and FIGS. 7(A), 7(B), the operation range of the high speed actuator is about plus or minus 2.0 mm (a path shown in the top drawing in FIG. 6(B)). Therefore, when the controller 10 is used, the operation range of the high speed actuator is reduced to ½ or less compared to "about plus or minus 4.5 mm (a path shown in the top drawing in FIG. 18(B))" when the "conventional controller" is used.

As described above, the controller 10 can reduce a phase lag of a trajectory (command trajectory) of the low speed actuator (the first actuator 22) and thus reduce the operation range of the high speed actuator (the second actuator 32).

Embodiment 2

Embodiment 2 of the disclosure will be described below with reference to FIG. 8 and FIG. 9. Here, for convenience of description, components having the same functions as the components described in the above embodiment are denoted with the same reference numerals and descriptions thereof are omitted. A control system 2 in the present embodiment is different from the control system 1 in Embodiment 1 described above in that a controller 11 which is a control device according to the present embodiment includes an envelope average acquisition unit 131 in place of the zero phase filter unit 130 of the controller 10. The configuration of the controller 11 is the same as the configuration of the controller 10 except that "the envelope average acquisition unit 131 is included in place of the zero phase filter unit 130."

(Overview of Control Device)

The controller 11 (control device) includes the envelope average acquisition unit 131 that generates a corrected trajectory SPf (first command trajectory) in which a high frequency component is removed from the first inverse kinematics trajectory SP (reference trajectory) so that no phase delay occurs as a command trajectory of the first servo control system 20 and the second inverse kinematics calculation unit 150 (second trajectory generation unit) configured to generate a second inverse kinematics trajectory IKt (second command trajectory) including a trajectory corresponding to the high frequency component as a command trajectory of the second servo control system 30.

According to the above configuration, the controller 11 removes a high frequency component from the first inverse kinematics trajectory SP so that a phase delay from the first inverse kinematics trajectory SP does not occur and generates the corrected trajectory SPf which is a command trajectory of the first servo control system 20.

Here, when a high frequency component is removed from the first inverse kinematics trajectory SP using a low pass filter, it is known that a phase lag (phase delay) occurs in the first inverse kinematics trajectory SP after the high frequency component is removed compared to the first inverse kinematics trajectory SP before the high frequency component is removed. Thus, the generated phase delay is compensated for in the second servo control system 30, that is, a part of a trajectory that was initially intended to be realized by the first servo control system 20 is realized in the second servo control system 30, and it is not possible to effectively use a range of movement of the second servo control system 30.

On the other hand, the controller 11 removes a high frequency component from the first inverse kinematics trajectory SP so that no phase delay occurs from the first inverse kinematics trajectory SP and generates the corrected trajectory SPf. Therefore, the first servo control system 20 can sufficiently adhere to the corrected trajectory SPf after the high frequency component is removed. That is, the controller 11 can maintain adherence of the first servo control system 20.

In addition, the controller 11 prevents the occurrence of a phase delay that is generated conventionally according to removal of the high frequency component, it is not necessary to compensate for a part of a trajectory that was initially intended to be realized by the first servo control system 20 in the second servo control system 30. That is, the controller 11 can effectively use a range of movement of the second servo control system 30.

As summarized above, the controller 11 can maintain adherence of the first servo control system 20 according to removal of the high frequency component and effectively use a range of movement of the second servo control system 30 by preventing the occurrence of a phase delay. Therefore, the controller 11 has an effect that it is possible to maintain adherence of the first servo control system 20 and it is possible to effectively use ranges of movement of the first servo control system 20 and the second servo control system 30.

In the controller 11, the envelope average acquisition unit 131 generates a corrected trajectory SPf from an average of upper and lower envelopes of a curve showing the first inverse kinematics trajectory SP.

According to the above configuration, the controller 11 generates a corrected trajectory SPf from an average of upper and lower envelopes of a curve showing the first inverse kinematics trajectory SP, and generates the corrected trajectory SPf in which a high frequency component is removed so that a phase delay from the first inverse kinematics trajectory SP does not occur. That is, the controller 11 can maintain adherence of the first servo control system 20 according to removal of the high frequency component and effectively use a range of movement of the second servo control system 30 by preventing the occurrence of a phase delay.

Therefore, the controller 11 has an effect that it is possible to maintain adherence of the first servo control system 20 and it is possible to effectively use ranges of movement of the first servo control system 20 and the second servo control system 30.

Next, a configuration and the like of the controller 11 of which the overview has been summarized above will be described in detail with reference to FIG. 8 and the like.

(Details of Control Device)

Figure 8:
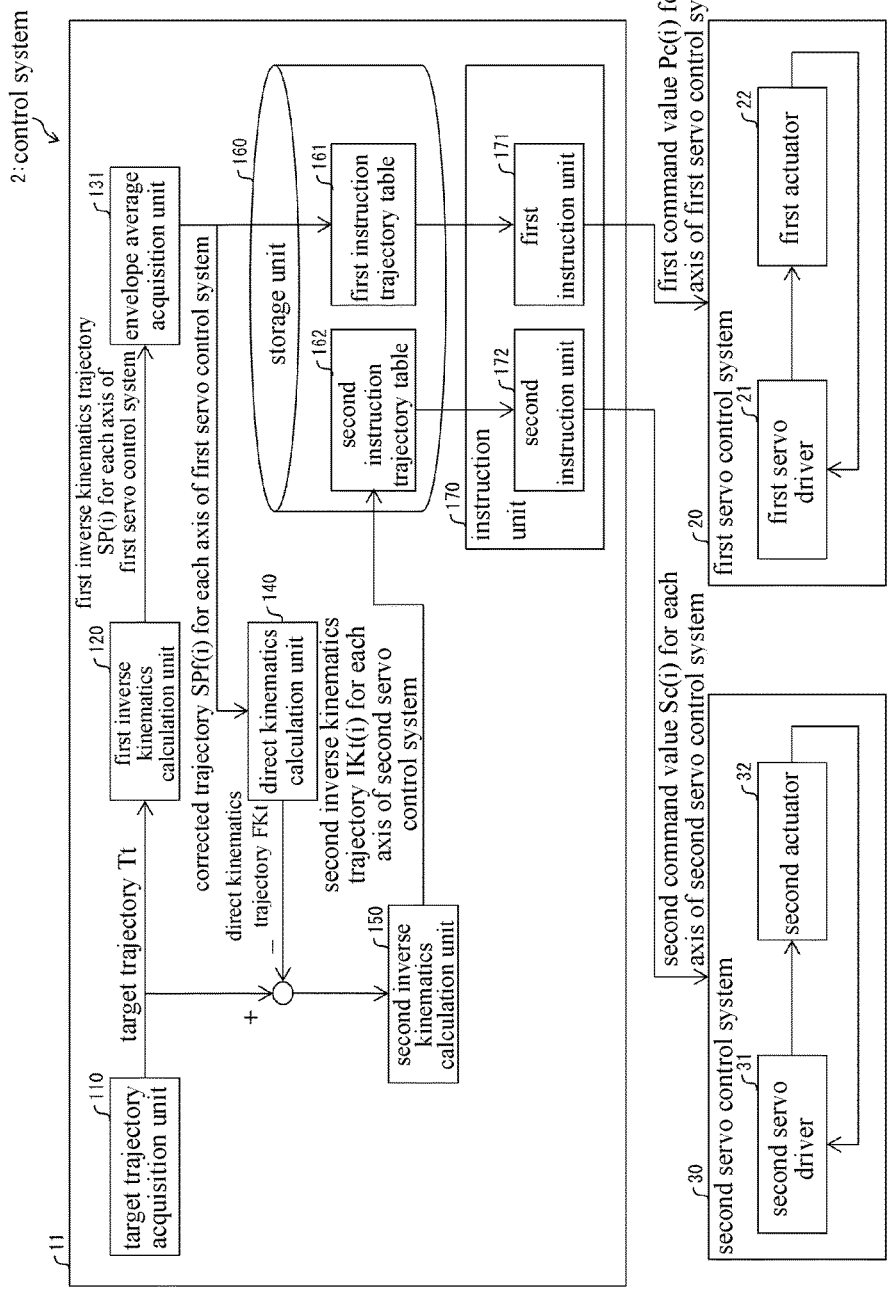
FIG. 8 is a block diagram showing a main part configuration and the like of a controller and the like according to Embodiment 2 of the disclosure.

FIG. 8 is a block diagram showing a main part configuration and the like of a controller and the like according to Embodiment 2 of the disclosure. As described above, since the configuration of the controller 11 is the same as the configuration of the controller 10 except that "the envelope average acquisition unit 131 is included in place of the zero phase filter unit 130," only the envelope average acquisition unit 131 will be described.

The envelope average acquisition unit 131 generates a corrected trajectory SPf(i) from an average of upper and lower envelopes of a curve showing the first inverse kinematics trajectory SP(i) acquired from the first inverse kinematics calculation unit 120. How the envelope average acquisition unit 131 generates a corrected trajectory SPf(i) from the first inverse kinematics trajectory SP(i) will be described with reference to FIG. 9.

Figure 9:
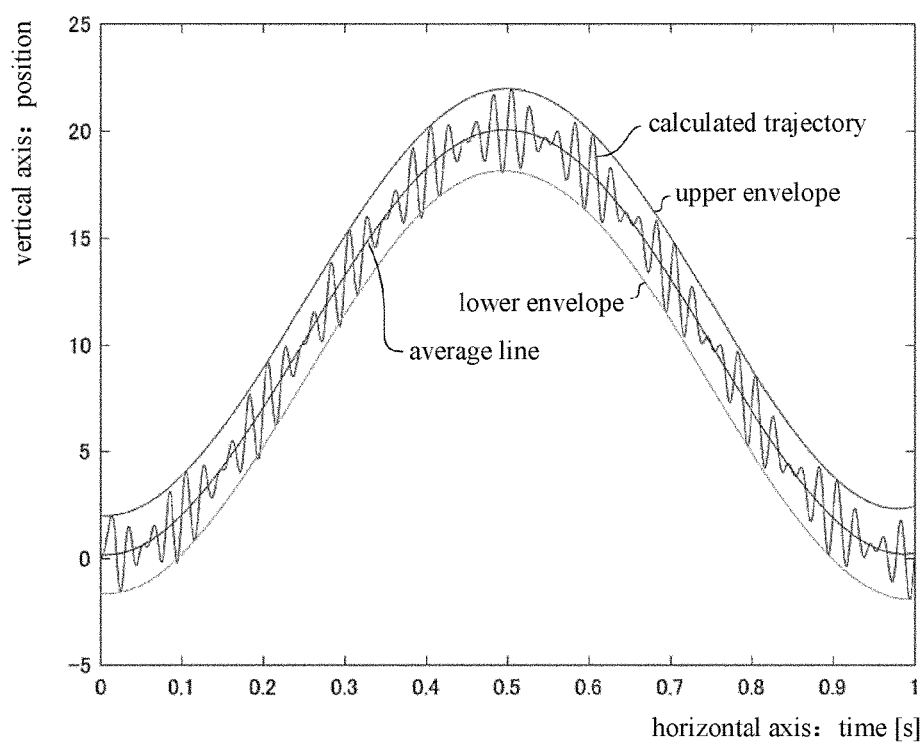
FIG. 9 is a diagram explaining a method of generating a command trajectory from an average of upper and lower envelopes of a curve showing a first calculation trajectory generated when the controller in FIG. 8 performs inverse kinematics calculation on a target trajectory.

FIG. 9 is a diagram explaining a method of generating a corrected trajectory SPf(i) from an average of upper and lower envelopes of a curve showing the first inverse kinematics trajectory SP(i) generated when the controller 11 performs inverse kinematics calculation on the target trajectory Tt. In FIG. 9, the vertical axis represents a position and the horizontal axis represents a time (t). Here, in FIG. 9, the first inverse kinematics trajectory SP(i) is abbreviated as "calculated trajectory," an upper envelope of a curve showing the first inverse kinematics trajectory SP(i) is abbreviated as an "upper envelope," and a lower envelope of a curve showing the first inverse kinematics trajectory SP(i) is abbreviated as a "lower envelope." In addition, a curve showing an average of the "upper envelope" and the "lower envelope" is abbreviated as an "average line."

The envelope average acquisition unit 131 obtains upper and lower envelopes of a "curve showing the first inverse kinematics trajectory SP(i) with the time axis as the horizontal axis" and sets a line showing an average of upper and lower envelopes ("average line" in FIG. 9) as a curve showing the corrected trajectory SPf(i). The envelope average acquisition unit 131 generates a corrected trajectory SPf(i) from the average of upper and lower envelopes of "a curve showing the first inverse kinematics trajectory SP(i) with the time axis as the horizontal axis" and thus removes a high frequency component from the first inverse kinematics trajectory SP(i) so that no phase delay occurs.

To summarize the above, the controller 11 generates a trajectory in which a high frequency component is removed from a trajectory that is generated by performing inverse kinematics calculation on the target trajectory Tt so that no phase delay occurs as a command trajectory of the first actuator 22. Specifically, in the controller 10, an average of upper and lower envelopes of a curve showing the first inverse kinematics trajectory SP(i) is used.

The controller 11 can reduce an operation range of the high speed actuator (the second actuator 32) by reducing a phase lag (phase delay) in the trajectory (command trajectory) of the low speed actuator (the first actuator 22). Therefore, the controller 11 can support a higher speed trajectory. In addition, the controller 11 can improve adherence of the low speed actuator by strengthening an effect of the low pass filter and improve control accuracy overall (both of the first servo control system 20 and the second servo control system 30). In addition, the controller 11 can expand options for the high speed actuator used in the control system 2 and can allow a high speed actuator to be used to be easily selected.

Embodiment 3

Embodiment 3 of the disclosure will be described below with reference to FIG. 10 to FIGS. 14(A), 14(B). Here, for convenience of description, components having the same functions as the components described in the above embodiment are denoted with the same reference numerals and descriptions thereof are omitted. A control system 3 in the present embodiment is different from the control system 1 in Embodiment 1 described above in that a controller 12 which is a control device according to the present embodiment includes an MPC command unit 180 in place of the instruction unit 170 of the controller 10. The configuration of the controller 11 is the same as the configuration of the controller 10 except that "the MPC command unit 180 is included in place of the instruction unit 170." Here, MPC refers to a "model predictive control" and the "model predictive control" will be appropriately abbreviated as "MPC" in the following description.

(Overview of Control System)

Figure 11:
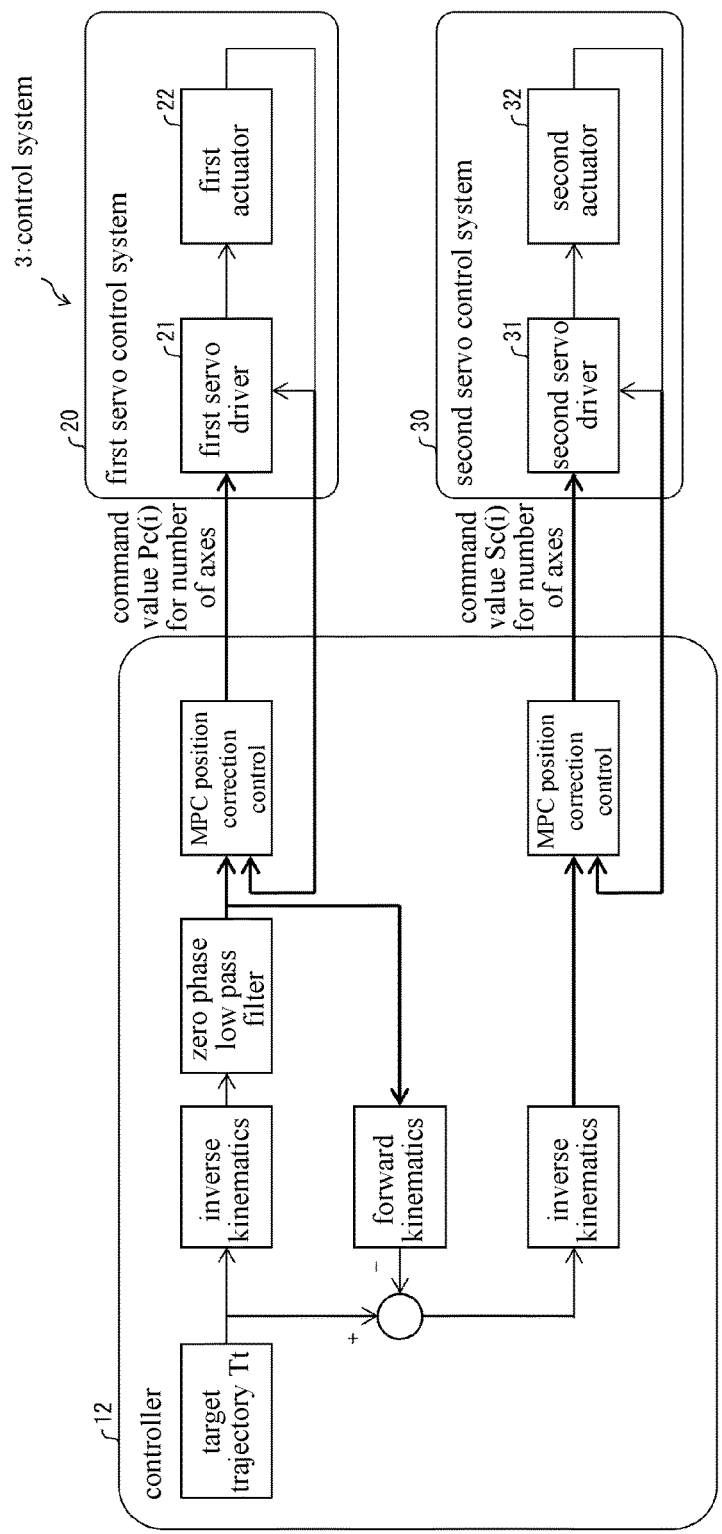
FIG. 11 is a diagram showing a general overview of a control system including the controller in FIG. 10.

FIG. 11 is a diagram showing a general overview of the control system 3 including the controller 12. In the controller 12 of the control system 3, a dynamic characteristics model of the low speed servo system (the first servo control system 20) created in advance is set. The controller 12 performs model predictive control for the first servo control system 20 using the dynamic characteristics model of the first servo control system 20. Specifically, the controller 12 corrects the first command value Pc(i) generated from the corrected trajectory SPf(i) for each control period of the first servo control system 20 according to MPC using the dynamic characteristics model of the first servo control system 20. Then, the controller 12 outputs the corrected first command value Pc(i) to the first servo control system 20. The controller 12 may perform MPC on the second servo control system 30 using the dynamic characteristics model of the second servo control system 30.

The controller 12 reduces a response delay on the side of the low speed actuator (the first actuator 22) by position correction control according to MPC and thus improves adherence performance.

(Overview of Control Device)

The controller 12 (control device) includes a first response prediction unit 183 (prediction unit) configured to predict a response of the first servo control system 20 corresponding to the corrected trajectory SPf using the dynamic characteristics model of the first servo control system 20.

According to the above configuration, the controller 12 predicts a response of the first servo control system 20 corresponding to the corrected trajectory SPf using the dynamic characteristics model of the first servo control system 20. Therefore, the controller 12 has an effect that it is possible to predict a response of the first servo control system 20 corresponding to the corrected trajectory SPf using the dynamic characteristics model of the first servo control system 20.

In the controller 12, the first response prediction unit 183 predicts a control amount which is an output of the first servo control system 20 with respect to a first command value Pc generated from the corrected trajectory SPf using the dynamic characteristics model of the first servo control system 20. The controller 12 includes a first MPC position command unit 181 (instruction unit) configured to output a first command value Pc corrected according to model predictive control using a control amount predicted by the first response prediction unit 183 and "a measured value of a control amount of the first servo control system 20" acquired as feedback information from the first servo control system 20 to the first servo control system 20.

According to the above configuration, the controller 12 outputs the first command value Pc corrected according to the model predictive control using "the control amount predicted using the dynamic characteristics model of the first servo control system 20" and "the measured value of the control amount of the first servo control system 20" to the first servo control system 20.

Therefore, the controller 12 has an effect that it is possible to improve performance of adherence of the first servo control system 20 to the corrected trajectory SPf and additionally, it is possible to improve an adherence performance of both of the first servo control system 20 and the second servo control system 30.

The controller 12 is a cooperative control controller that predicts a response delay using the dynamic characteristics model of the first servo control system 20 and regains the predicted response delay in the first servo control system 20. That is, the controller 12 improves trajectory adherence of the low speed actuator (the first actuator 22) by position correction control according to the model predictive control using the dynamic characteristics model of the first servo control system 20.

In addition, the controller 12 improves trajectory adherence of the high speed actuator (the second actuator 32) by position correction control according to the model predictive control using the dynamic characteristics model of the second servo control system 30.

Next, a configuration and the like of the controller 12 of which the overview has been summarized above will be described in detail with reference to FIG. 10 and the like.

(Details of Control Device)

Figure 10:
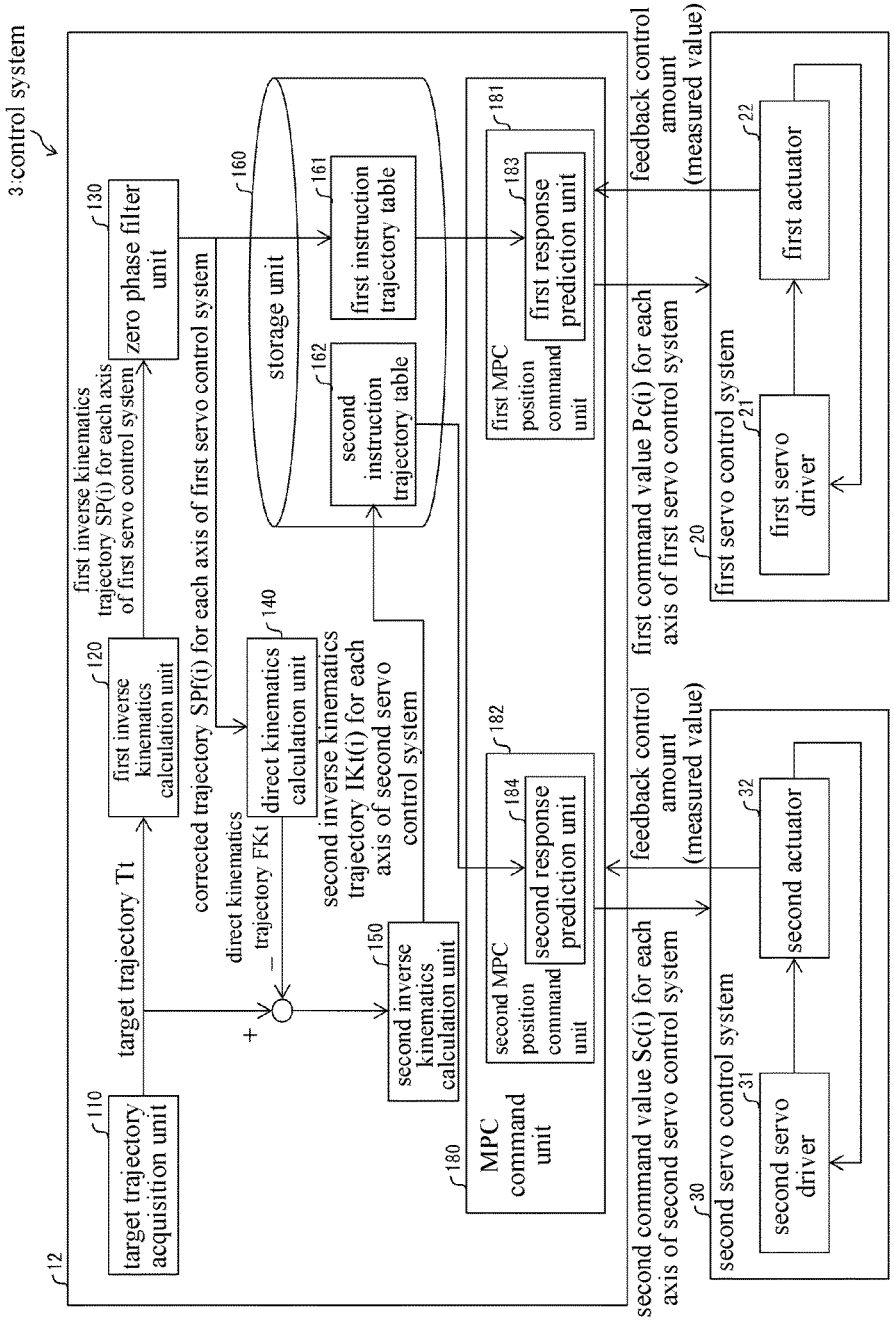
FIG. 10 is a block diagram showing a main part configuration and the like of a controller and the like according to Embodiment 3 of the disclosure.

FIG. 10 is a block diagram showing a main part configuration and the like of the controller 12 and the like. As described above, since the configuration of the controller 12 is the same as the configuration of the controller 10 except that "the MPC command unit 180 is included in place of the instruction unit 170," only the MPC command unit 180 will be described.

The MPC command unit 180 includes a first MPC position command unit 181 configured to output the first command value Pc(i) to the first servo control system 20 and a second MPC position command unit 182 configured to output the second command value Sc(i) to the second servo control system 30.

The first MPC position command unit 181 includes the first response prediction unit 183. In the first response prediction unit 183, the dynamic characteristics model of the first servo control system 20 created in advance is set. The first response prediction unit 183 may create the dynamic characteristics model of the first servo control system 20 in advance and may set the created dynamic characteristics model of the first servo control system 20 therein.

The first MPC position command unit 181 performs the following two processes. First, the first MPC position command unit 181 generates a first command value Pc(i) for each axis of the first servo control system 20 from "a command trajectory of the first servo control system 20" for each control period of the first servo control system 20. For example, the first MPC position command unit 181 refers to the first instruction trajectory table 161 of the storage unit 160 and acquires a corrected trajectory SPf(i) as "a command trajectory of the first servo control system 20." Then, the first MPC position command unit 181 generates a first command value Pc(i) for each axis of the first servo control system 20 from the corrected trajectory SPf(i), for example, every 1 ms.

Second, the first MPC position command unit 181 corrects the first command value Pc(i) generated from the corrected trajectory SPf(i) for each control period of the first servo control system 20 according to model predictive control and outputs the corrected first command value Pc(i) to the first servo control system 20.

Specifically, the first response prediction unit 183 predicts a control amount which is an output of the first servo control system 20 with respect to the first command value Pc(i) using the set dynamic characteristics model of the first servo control system 20. The first MPC position command unit 181 performs model predictive control using the control amount predicted by the first response prediction unit 183 and the measured value of the control amount of the first servo control system 20 acquired as feedback information from the first servo control system 20. That is, the first MPC position command unit 181 corrects the first command value Pc(i) using "the control amount which is an output of the first servo control system 20" predicted by the first response prediction unit 183 using the dynamic characteristics model of the first servo control system 20 and the measured value of the control amount of the first servo control system 20. Then, the first MPC position command unit 181 outputs the corrected first command value Pc(i) using the model predictive control to the first servo control system 20 for each control period of the first servo control system 20. The first MPC position command unit 181 outputs the corrected first command value Pc(i) to the first servo control system 20, for example, 1 ms.

The second MPC position command unit 182 includes a second response prediction unit 184. In the second response prediction unit 184, the dynamic characteristics model of the second servo control system 30 created in advance is set. The second response prediction unit 184 may create the dynamic characteristics model of the second servo control system 30 in advance and may set the created dynamic characteristics model of the second servo control system 30 therein.

The second MPC position command unit 182 performs the following two processes. First, the second MPC position command unit 182 generates a second command value Sc(i) for each axis of the second servo control system 30 from "a command trajectory of the second servo control system 30" for each control period of the second servo control system 30. For example, the second MPC position command unit 182 refers to the second instruction trajectory table 162 of the storage unit 160 and acquires a second inverse kinematics trajectory IKt(i) as "a command trajectory of the second servo control system 30." Then, the second MPC position command unit 182 generates a second command value Sc(i) for each axis of the second servo control system 30 from the second inverse kinematics trajectory IKt(i), for example, every 1/12 ms.

Second, the second MPC position command unit 182 corrects the second command value Sc(i) generated from the second inverse kinematics trajectory IKt(i) for each control period of the second servo control system 30 according to model predictive control and outputs the corrected second command value Sc(i) to the second servo control system 30.

Specifically, the second response prediction unit 184 predicts a control amount which is an output of the second servo control system 30 with respect to the second command value Sc(i) using the set dynamic characteristics model of the second servo control system 30. The second MPC position command unit 182 performs model predictive control using the control amount predicted by the second response prediction unit 184 and the measured value of the control amount of the second servo control system 30 acquired as feedback information from the second servo control system 30. That is, the second MPC position command unit 182 corrects the second command value Sc(i) using "the control amount which is an output of the second servo control system 30" predicted by the second response prediction unit 184 using the dynamic characteristics model of the second servo control system 30 and the measured value of the control amount of the second servo control system 30. Then, the second MPC position command unit 182 outputs the corrected second command value Sc(i) using the model predictive control to the second servo control system 30 for each control period of the second servo control system 30. The second MPC position command unit 182 outputs the corrected second command value Sc(i) to the second servo control system 30, for example, every 1/12 ms.

(Dynamic Characteristics Model)

The dynamic characteristics models of the first servo control system 20 and the second servo control system 30 are represented by, for example, a discrete-time transfer function shown in the following (Formula 1). In (Formula 1), u denotes an input, y denotes an output (a predicted control amount, that is, a predicted value of a control amount), d, $a_1$ to $a_n$ and $b_1$ to $b_m$ denote characteristic parameters, and $z^{-1}$ denotes a delay operator.

Dynamic Characteristics Model Example: Discrete-Time Transfer Function $$y = z^{-d} \frac{b_1 z^{-1} + b_2 z^{-2} + \ldots + b_m z^{-m}}{1 + a_1 z^{-1} + a_2 z^{-2} + \ldots + a_n z^{-n}} u \quad \text{(Formula 1)}$$

In the controller 12, the dynamic characteristics model exemplified in (Formula 1) is created in advance for each of the first servo control system 20 and the second servo control system 30, and the created dynamic characteristics models are set in the first response prediction unit 183 and the second response prediction unit 184.

Here, it is not necessary for the MPC command unit 180 to include the second MPC position command unit 182 and the second response prediction unit 184, and the controller 12 may include at least the first MPC position command unit 181 and the first response prediction unit 183. That is, the controller 12 only needs to reduce a response delay on the side of the low speed actuator (the first actuator 22) according to the model predictive control using the dynamic characteristics model of the first servo control system 20. When there is room for improvement in adherence in the second actuator 32, the controller 12 may correct the second command value Sc(i) according to the model predictive control using the dynamic characteristics model of the second servo control system 30 and improve an adherence performance of the second actuator 32.

(Processes Performed by Controller)

Figure 12:
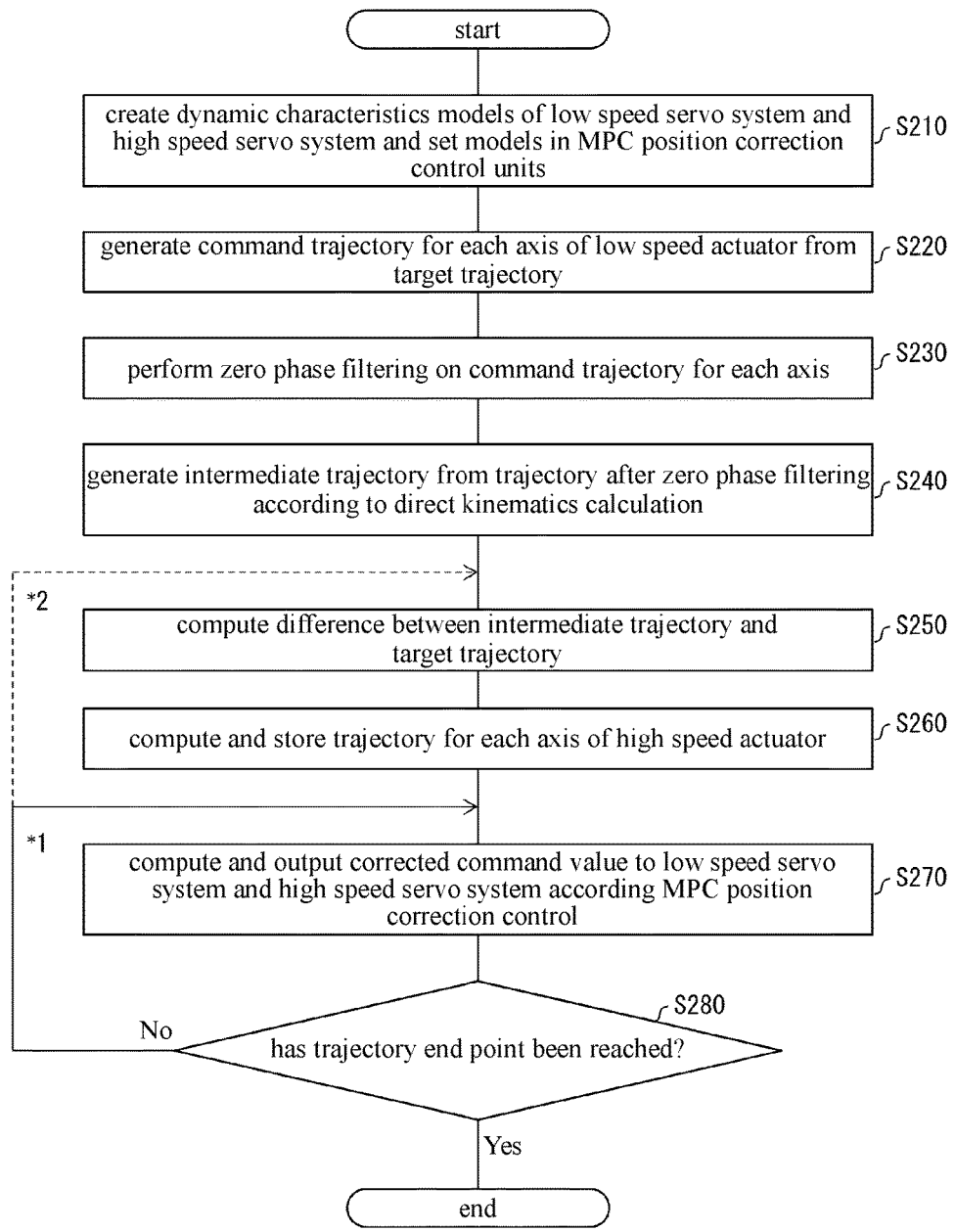
FIG. 12 is a flowchart showing an overview of processes performed by the controller in FIG. 10.

FIG. 12 is a flowchart showing an overview of processes performed by the controller 12. The controller 12 creates a dynamic characteristics model of the first servo control system 20 in advance and performs MPC position correction control on the side of the low speed actuator (the first actuator 22) using the created dynamic characteristics model of the first servo control system 20. Specifically, the controller 12 corrects the first command value Pc(i) according to MPC using the dynamic characteristics model of the first servo control system 20 and outputs the corrected first command value Pc(i) to the first servo control system 20. When there is room for improvement in adherence in the high speed actuator (the second actuator 32), the controller 12 may also apply MPC position correction control for control of the second actuator 32. In other words, when MPC position correction control is applied for control of the second actuator 32, the controller 12 can reduce an adherence error due to a response delay of the second actuator 32. Processes performed by the controller 12 when the controller 12 performs MPC position correction control on the first actuator 22 and the second actuator 32 will be described below in detail with reference to FIG. 12.

The controller 12 creates dynamic characteristics models of the low speed servo system (the first servo control system 20) and the high speed servo system (the second servo control system 30) in advance and sets the models in the first response prediction unit 183 and the second response prediction unit 184 (S210).

The first inverse kinematics calculation unit 120 generates a command value for each axis of the first actuator 22 from the target trajectory Tt, that is, performs inverse kinematics calculation on the target trajectory Tt and generates the first inverse kinematics trajectory SP(i) (S220).

The zero phase filter unit 130 performs zero phase filtering on the trajectory for each axis (that is, the first inverse kinematics trajectory SP(i)) and stores the generated corrected trajectory SPf(i) in the first instruction trajectory table 161 of the storage unit 160 (S230).

The controller 12 computes "a difference between a command value generated from a command trajectory after zero phase filtering and a command value of a target trajectory," and generates the command value for each axis of the high speed actuator (the second actuator 32) from the computed difference.

For example, the direct kinematics calculation unit 140 generates an intermediate trajectory (that is, the direct kinematics trajectory FKt) from the trajectory after zero phase filtering (that is, the corrected trajectory SPf(i)) according to direct kinematics calculation (S240). Then, the second inverse kinematics calculation unit 150 computes a difference (error) between the intermediate trajectory and the target trajectory Tt (S250). Then, the second inverse kinematics calculation unit 150 computes a trajectory for each axis of the second actuator 32 using the error (difference) computed in S250 and stores it in the second instruction trajectory table 162 of the storage unit 160 (S260). Specifically, the second inverse kinematics calculation unit 150 performs inverse kinematics calculation on "an error between an intermediate trajectory (that is, the direct kinematics trajectory FKt) and the target trajectory Tt" and generates the second inverse kinematics trajectory IKt(i) which is a command trajectory for each axis of the second servo control system 30. Then, the second inverse kinematics calculation unit 150 stores the generated second inverse kinematics trajectory IKt(i) in the second instruction trajectory table 162 of the storage unit 160.

The second inverse kinematics calculation unit 150 generates a second inverse kinematics trajectory IKt including a trajectory corresponding to an error between the first inverse kinematics trajectory SP and the corrected trajectory SPf. Specifically, the second inverse kinematics calculation unit 150 generates a second inverse kinematics trajectory IKt including a trajectory corresponding to an error between the first inverse kinematics trajectory SP and the corrected trajectory SPf so that "a combined trajectory of the corrected trajectory SPf and the second inverse kinematics trajectory IKt matches the target trajectory Tt."

The controller 12 computes the corrected command value of each of the low speed servo system and the high speed servo system according MPC position correction control and outputs the computed and corrected command value to the low speed servo system and the high speed servo system (S270). Specifically, the MPC command unit 180 corrects the first command value Pc(i) and the second command value Sc(i) according to MPC using the dynamic characteristics models of the first servo control system 20 and the second servo control system 30 and outputs a corrected first command value Pc(i) and a corrected second command value Sc(i).

The first MPC position command unit 181 corrects the first command value Pc(i) generated from the corrected trajectory SPf(i) stored in the first instruction trajectory table 161 for each control period of the first servo control system 20 according to MPC using the dynamic characteristics model of the first servo control system 20. Then, the first MPC position command unit 181 outputs the corrected first command value Pc(i) to the first servo control system 20

The second MPC position command unit 182 corrects the second command value Sc(i) generated from the second inverse kinematics trajectory IKt(i) stored in the second instruction trajectory table 162 for each control period of the second servo control system 30 according to MPC using the dynamic characteristics model of the second servo control system 30. Then, the second MPC position command unit 182 outputs the corrected second command value Sc(i) to the second servo control system 30. Then, the controller 12 repeats the processes of S250 to S270 or the process of S270 for each control period while determining whether a trajectory end point has been reached (S280). Specifically, the controller 12 repeats "a process related to only the first servo control system 20" among "the processes of S250 to S270 or the process of S270" with a control period of the first servo control system 20 while determining whether a trajectory end point has been reached (S280). In addition, the controller 12 repeats a process (for example, a process related to the second servo control system 30) other than "a process related to only the first servo control system 20" among "the processes of S250 to S270 or the process of S270" with a control period of the second servo control system 30 while determining whether a trajectory end point has been reached (S280).

(Effects of Controller)

Figures 13A, 13B:
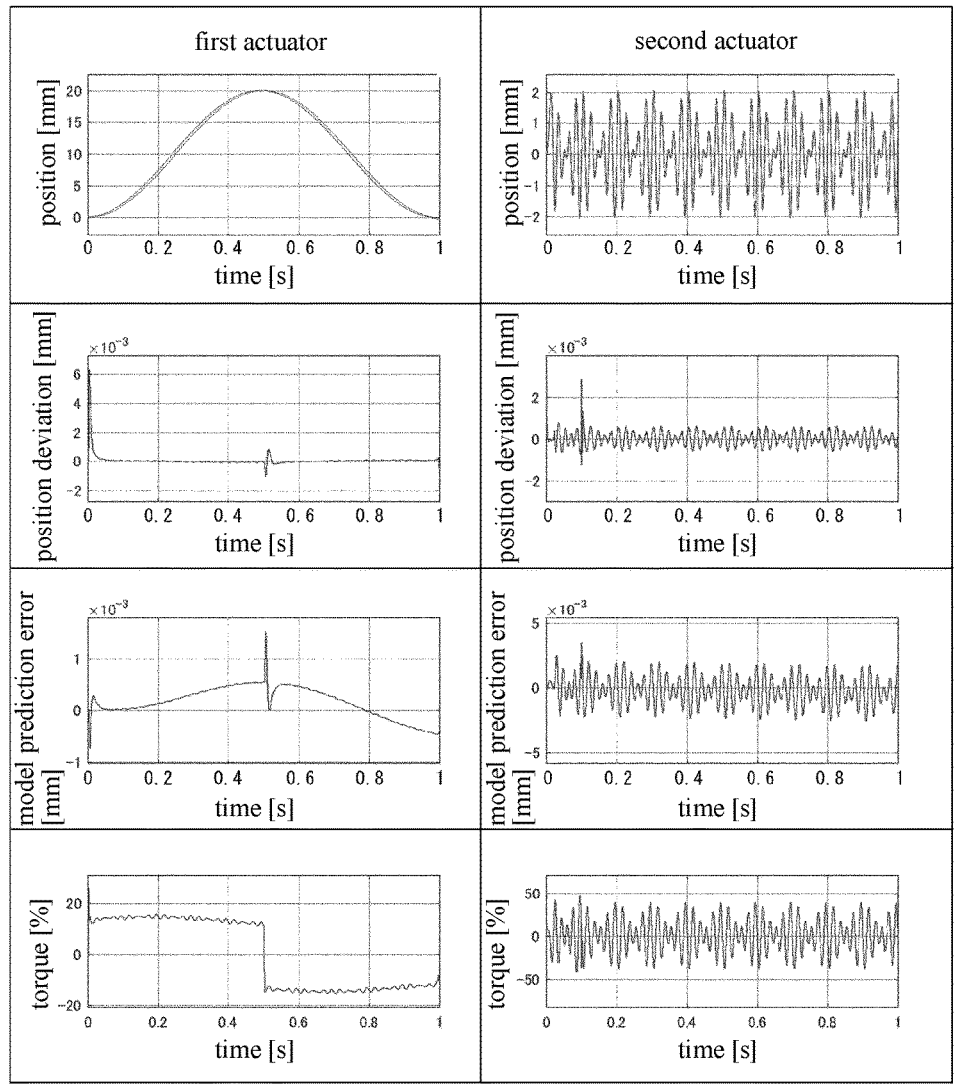
FIGS. 13(A) and 13(B) are diagrams showing changes in positions, position deviations, model prediction errors, and torques of a first actuator and a second actuator controlled by the controller in FIG. 10 in the control test shown in FIGS. 5(A) and 5(B).

FIGS. 13(A) and 13(B) are diagrams showing changes in positions, position deviations, model prediction errors, and torques of the first actuator 22 and the second actuator 32 controlled by the controller 12 in the control test shown in FIGS. 5(A) and 5(B). FIG. 13(A) shows changes in position, position deviation, model prediction error, and torque of the first actuator 22 controlled by the controller 12 in order from the top. FIG. 13(B) shows changes in position, position deviation, model prediction error, and torque of the second actuator 32 controlled by the controller 12 in order from the top. In all of the drawings shown in FIGS. 13(A) and 13(B), the horizontal axis represents a time (t).

Figures 14A, 14B:
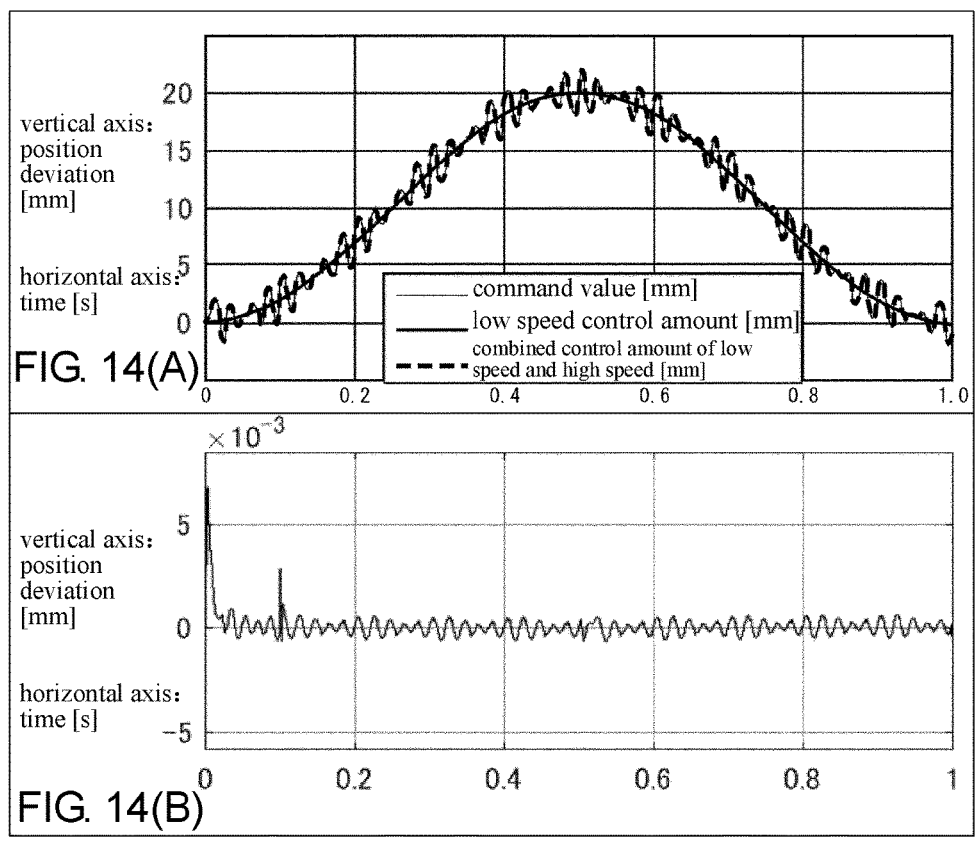
FIGS. 14(A) and 14(B) are diagrams showing all positions and changes in position deviations of the first actuator and the second actuator controlled by the controller in FIG. 10 in the control test shown in FIGS. 5(A) and 5(B).

FIGS. 14(A) and 14(B) are diagrams showing all positions (FIG. 14(A)) and changes in position deviation (FIG. 14(B)) of the first actuator 22 and the second actuator 32 controlled by the controller 12 in the control test shown in FIGS. 5(A) and 5(B). In all of the drawings shown in FIGS. 14(A) and 14(B), the horizontal axis represents a time (t). Here, in FIG. 14(A), a command value and a combined control amount of low speed and high speed (a value obtained by adding (combining) a measured value of a control amount of the first actuator 22 and a measured value of a control amount of the second actuator 32) almost overlap.

The controller 12 performs low pass filtering on the first inverse kinematics trajectory SP(i) in order "from a reverse direction to a forward direction of the time axis" one round trip and generates "a command trajectory of the first servo control system 20." That is, the controller 12 performs zero phase filter processing on the first inverse kinematics trajectory SP(i) in order "from a reverse direction to a forward direction of the time axis," and generates "a command trajectory of the first servo control system 20." The low pass filter type of the low pass filter used in the controller 12 is a second-order Butterworth type with a cutoff frequency of 10 Hz. The controller 12 additionally corrects the first command value Pc(i) and the second command value Sc(i) by MPC using dynamic characteristics models of the first servo control system 20 and the second servo control system 30 and improves adherence performance.

Similarly to the controller 10, compared to the conventional controller whose control results are shown in FIGS. 18(A), 18(B) and FIGS. 19(A), 19(B), the controller 12 can reduce a phase lag of a command trajectory of the low speed actuator and thus can reduce the operation range of the high speed actuator. In addition, the position deviation exemplified in FIG. 14(B) is significantly smaller than the position deviation exemplified in FIG. 7(B).

Embodiment 4

Embodiment 4 of the disclosure will be described below with reference to FIG. 15 to FIG. 17. Here, for convenience of description, components having the same functions as the components described in the above embodiment are denoted with the same reference numerals and descriptions thereof are omitted. A control system 4 in the present embodiment is different from the control system 1 in Embodiment 1 described above in that a controller 13 which is a control device according to the present embodiment includes a response prediction unit 190 in addition to the configuration of the controller 10. The configuration of the controller 13 is the same as the configuration of the controller 10 except that "the response prediction unit 190 is further included."

(Overview of Control System)

Figure 16:
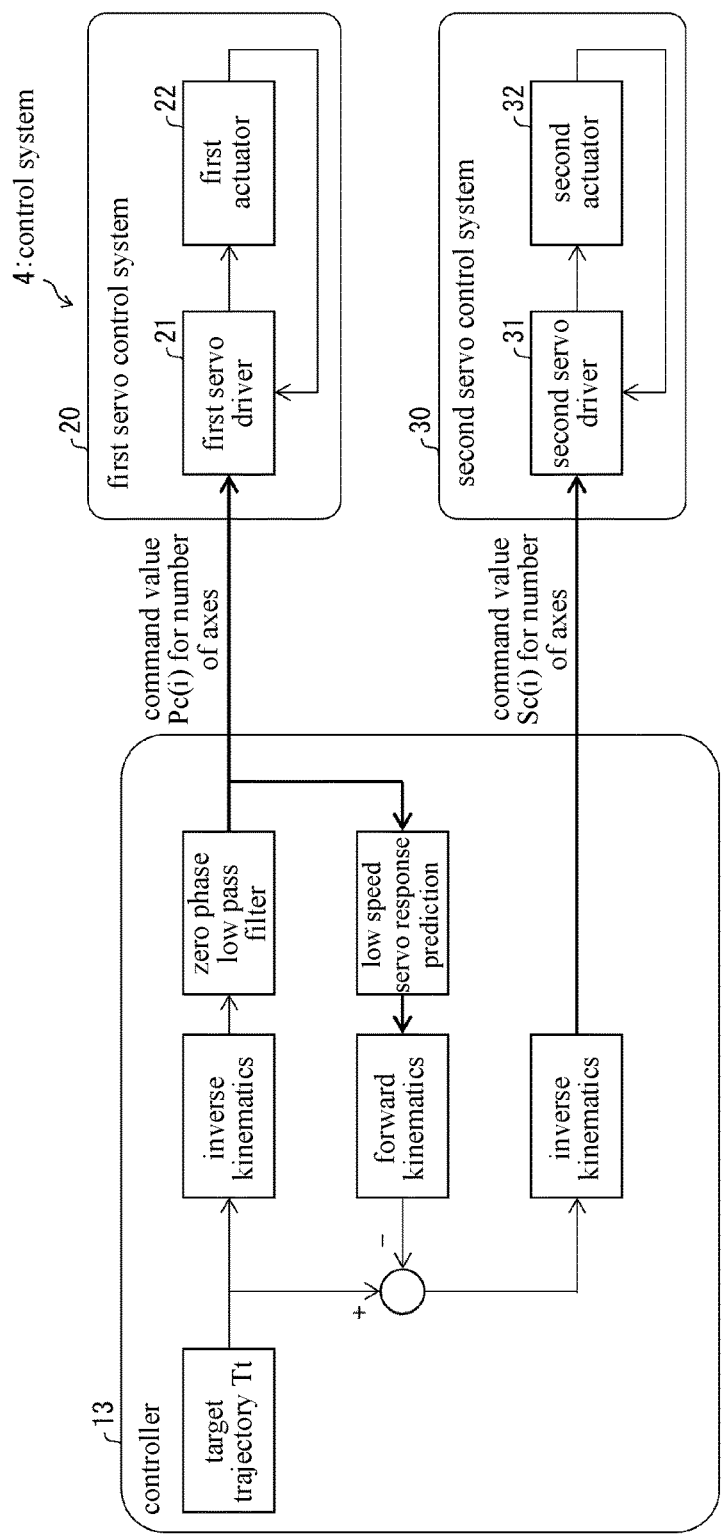
FIG. 16 is a diagram showing a general overview of a control system including the controller in FIG. 15.

FIG. 16 is a diagram showing a general overview of the control system 4 including the controller 13. In the controller 13 of the control system 4, a dynamic characteristics model of the low speed servo system (the first servo control system 20) created in advance is set. The controller 13 predicts a response of the low speed servo (that is, the first servo control system 20) corresponding to the corrected trajectory SPf(i) after zero phase filter processing using the set dynamic characteristics model of the low speed servo system.

Here, predicting a response delay using the dynamic characteristics model of the first servo control system 20 is common between the controller 12 and the controller 13 described above. The controller 12 and the controller 13 differ the unit in which the predicted response delay is regained. The controller 12 regains the predicted response delay in the first servo control system 20, but the controller 13 regains the predicted response delay in the second servo control system 30 (the second actuator 32).

The controller 13 predicts a response of the first actuator 22, reflects a response delay in a command trajectory of the second actuator 32, and thus regains the response delay in the second servo control system 30 (the second actuator 32). Specifically, the controller 13 performs inverse kinematics calculation on "an error between an intermediate trajectory generated by performing direct kinematics calculation on the predicted response of the first servo control system 20 and the target trajectory Tt" and generates the command trajectory of the second servo control system 30.

According to the method described above, the controller 13 generates "a command trajectory of the second servo control system 30" in which "the predicted response of the first servo control system 20 (the first actuator 22)" is reflected. Then, the controller 13 generates a second command value Sc(i) which is "a command value of the second servo control system 30" from "a command trajectory of the second servo control system 30" in which "the predicted response of the first servo control system 20" is reflected. When the controller 13 outputs the generated second command value Sc(i) to the second servo control system 30, it is possible to improve an adherence performance of both of the first servo control system 20 and the second servo control system 30.

That is, the controller 13 improves an adherence performance of both (all) of the first actuator 22 and the second actuator 32 by covering a response delay on the side of the first actuator 22 on the side of the second actuator 32. However, control by the controller 13 tends to widen the operation range of the second actuator 32 compared to control by the controller 12.

(Overview of Control Device)

The controller 13 (control device) includes the response prediction unit 190 (prediction unit) configured to predict a response of the first servo control system 20 corresponding to the corrected trajectory SPf using the dynamic characteristics model of the first servo control system 20.

According to the above configuration, the controller 13 predicts a response of the first servo control system 20 corresponding to the corrected trajectory SPf using the dynamic characteristics model of the first servo control system 20. Therefore, the controller 13 has an effect that it is possible to predict a response of the first servo control system 20 corresponding to the corrected trajectory SPf using the dynamic characteristics model of the first servo control system 20.

In the controller 13, the second inverse kinematics calculation unit 150 (second trajectory generation unit) generates a second inverse kinematics trajectory IKt (second command trajectory) including a trajectory corresponding to an error between the direct kinematics trajectory FKt (intermediate trajectory) generated using the response of the first servo control system 20 predicted by the response prediction unit 190 and the first inverse kinematics trajectory SP (or the target trajectory Tt).

That is, the second inverse kinematics calculation unit 150 generates a second inverse kinematics trajectory IKt including a trajectory corresponding to "a high frequency component removed from the first inverse kinematics trajectory SP(i) by the zero phase filter unit 130" as "a command trajectory of the second servo control system 30." Specifically, the second inverse kinematics calculation unit 150 generates a second inverse kinematics trajectory IKt including a trajectory corresponding to an error between the first inverse kinematics trajectory SP and an intermediate trajectory generated from the response of the first servo control system 20 predicted by the response prediction unit 190. The second inverse kinematics calculation unit 150 generates a second inverse kinematics trajectory IKt including a trajectory corresponding to an error between the first inverse kinematics trajectory SP and the intermediate trajectory so that "a combined trajectory of the intermediate trajectory and the second inverse kinematics trajectory IKt matches the target trajectory Tt."

In addition, the second inverse kinematics calculation unit 150 may generate a second inverse kinematics trajectory IKt using, for example, an error between the target trajectory Tt and the intermediate trajectory. That is, the second inverse kinematics calculation unit 150 may generate a second inverse kinematics trajectory IKt using an error between the target trajectory Tt and the intermediate trajectory so that "a combined trajectory of the intermediate trajectory and the second inverse kinematics trajectory IKt matches the target trajectory Tt."

According to the above configuration, the controller 13 generates a second inverse kinematics trajectory IKt including a trajectory corresponding to an error between the direct kinematics trajectory FKt generated using the response of the first servo control system 20 predicted by the response prediction unit 190 and the first inverse kinematics trajectory SP (or the target trajectory Tt).

Therefore, the controller 13 has an effect that the second servo control system 30 can compensate for a response delay of the first servo control system 20 and it is possible to improve an adherence performance of both of the first servo control system 20 and the second servo control system 30.

Next, a configuration and the like of the controller 13 of which the overview has been summarized above will be described in detail with reference to FIG. 15 and the like.

(Details of Control Device)

Figure 15:
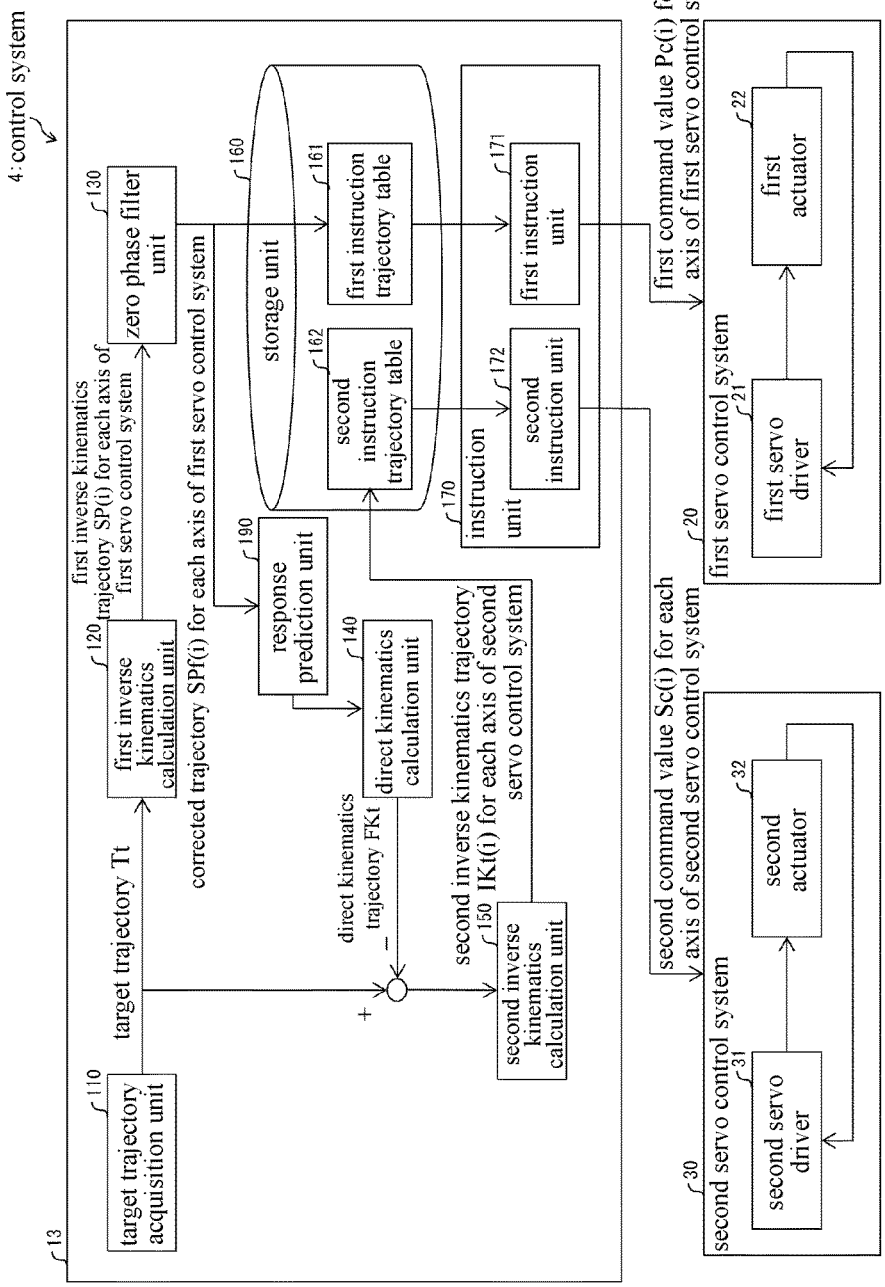
FIG. 15 is a block diagram showing a main part configuration and the like of a controller and the like according to Embodiment 4 of the disclosure.

FIG. 15 is a block diagram showing a main part configuration and the like of the controller 13 and the like according to Embodiment 4 of the disclosure. As described above, since the configuration of the controller 13 is the same as the configuration of the controller 10 except that "the response prediction unit 190 is further included," only the response prediction unit 190 will be described.

The response prediction unit 190 creates a dynamic characteristics model of the low speed servo system (that is, the first servo control system 20) in advance, and predicts a response of the first servo control system 20 corresponding to the corrected trajectory SPf(i) generated by the zero phase filter unit 130 using the created dynamic characteristics model. The response prediction unit 190 outputs the predicted response of the first servo control system 20 to the direct kinematics calculation unit 140 and the direct kinematics calculation unit 140 generates a direct kinematics trajectory FKt (intermediate trajectory) from direct kinematics calculation on the response of the first servo control system 20 predicted by the response prediction unit 190. "The dynamic characteristics model of the first servo control system 20" used by the response prediction unit 190 may be represented by a discrete-time transfer function shown in, for example, the above (Formula 1).

(Processes Performed by Controller)

Figure 17:
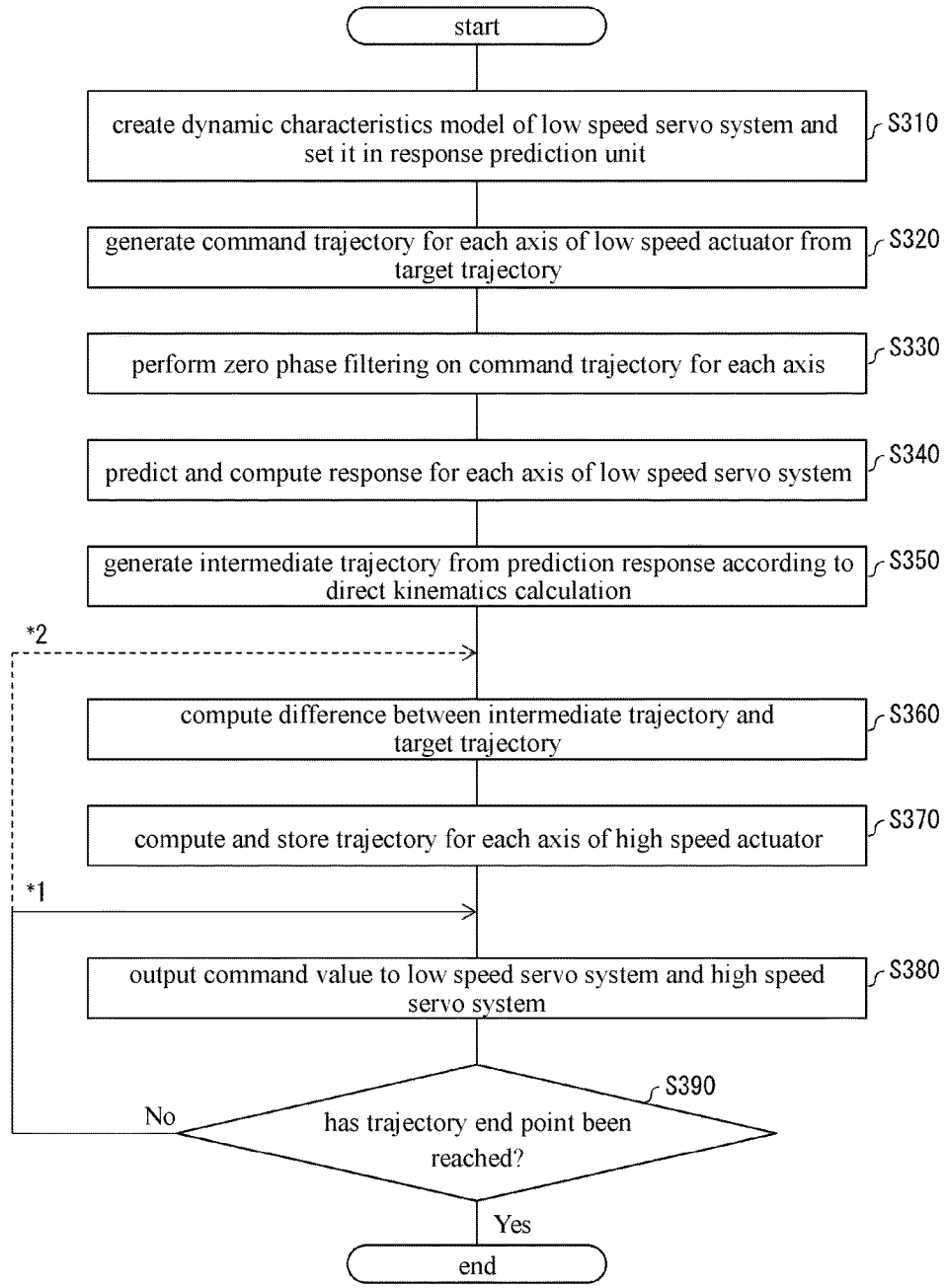
FIG. 17 is a flowchart showing an overview of processes performed by the controller in FIG. 15.

FIG. 17 is a flowchart showing an overview of processes performed by the controller 13. First, a dynamic characteristics model of the low speed servo system (the first servo control system 20) is created and set in a low speed servo response prediction unit (that is, the response prediction unit 190) (S310).

The first inverse kinematics calculation unit 120 generates a command value for each axis of the first actuator 22 from the target trajectory Tt, that is, performs inverse kinematics calculation on the target trajectory Tt, and generates the first inverse kinematics trajectory SP(i) (S320).

The zero phase filter unit 130 performs zero phase filtering on a trajectory for each axis (that is, the first inverse kinematics trajectory SP(i)), and stores the generated corrected trajectory SPf(i) in the first instruction trajectory table 161 of the storage unit 160 (S330).

The response prediction unit 190 predicts and computes a response for each axis of the low speed servo system for the corrected trajectory SPf(i) using the dynamic characteristics model of the first servo control system 20, that is, predicts a response of the first servo control system 20 corresponding to the corrected trajectory SPf(i) (S340).

The controller 13 computes "a difference between a predicted response (a predicted value of a control amount of the first servo control system 20) and a command value of the target trajectory" and generates the command value for each axis of the high speed actuator (the second actuator 32) from the computed difference.

For example, the direct kinematics calculation unit 140 performs direct kinematics calculation on the response of the first servo control system 20 predicted by the response prediction unit 190 (a predicted value of a control amount of the first servo control system 20), and generates an intermediate trajectory (that is, the direct kinematics trajectory FKt) (S350). Then, the second inverse kinematics calculation unit 150 computes a difference (error) between the intermediate trajectory and the target trajectory Tt (S360). Then, the second inverse kinematics calculation unit 150 computes a trajectory for each axis of the second actuator 32 using the error (difference) computed in S360 and stores it in the second instruction trajectory table 162 of the storage unit 160 (S370). Specifically, the second inverse kinematics calculation unit 150 performs inverse kinematics calculation on "an error between the intermediate trajectory (that is, the direct kinematics trajectory FKt) and the target trajectory Tt" and generates the second inverse kinematics trajectory IKt(i) which is a command trajectory for each axis of the second servo control system 30. Then, the second inverse kinematics calculation unit 150 stores the generated second inverse kinematics trajectory IKt(i) in the second instruction trajectory table 162 of the storage unit 160. The second inverse kinematics calculation unit 150 generates a second inverse kinematics trajectory IKt including a trajectory corresponding to an error between the first inverse kinematics trajectory SP and "the intermediate trajectory generated from the response of the first servo control system 20 predicted by the response prediction unit 190."

The instruction unit 170 outputs a command value at a current time to the low speed servo system (that is, the first servo control system 20) and the high speed servo system (that is, the second servo control system 30) from the stored trajectory for each axis (S380). Specifically, the first instruction unit 171 generates a first command value Pc(i) for each control period of the first servo control system 20 from the corrected trajectory SPf(i) stored in the first instruction trajectory table 161, and outputs the generated first command value Pc(i) to the first servo control system 20. In addition, the second instruction unit 172 generates a second command value Sc(i) for each control period of the second servo control system 30 from the second inverse kinematics trajectory IKt(i) stored in the second instruction trajectory table 162, and outputs the generated second command value Sc(i) to the second servo control system 30. The controller 13 repeats the processes of S360 to S380 or the process of S380 for each control period while determining whether a trajectory end point has been reached (S390). Specifically, the controller 13 repeats "a process related to only the first servo control system 20" among "the processes of S360 to S380 or the process of S380" with a control period of the first servo control system 20 while determining whether a trajectory end point has been reached (S390). In addition, the controller 13 repeats a process (for example, a process related to the second servo control system 30) other than "a process related to only the first servo control system 20" among "the processes of S360 to S380 or the process of S380" with a control period of the second servo control system 30 while determining whether a trajectory end point has been reached (S390).

Modified Example

An example in which the controllers 10, 11, 12, and 13 control two servo control systems of the first servo control system 20 and the second servo control system 30 in cooperation has been described above. However, it is not necessary to provide two servo control systems that the controllers 10, 11, 12, and 13 control in cooperation. The controllers 10, 11, 12, and 13 may output a command value generated using the target trajectory Tt to a plurality of servo control systems and control the plurality of servo control systems in cooperation.

[Example of Implementation by Software]

Control blocks (in particular, the target trajectory acquisition unit 110, the first inverse kinematics calculation unit 120, the zero phase filter unit 130, the envelope average acquisition unit 131, the direct kinematics calculation unit 140, the second inverse kinematics calculation unit 150, the instruction unit 170, the first instruction unit 171, the second instruction unit 172, the MPC command unit 180, the first MPC position command unit 181, the second MPC position command unit 182, the first response prediction unit 183, the second response prediction unit 184, and the response prediction unit 190) of the controllers 10, 11, 12, and 13 may be implemented by a logic circuit (hardware) formed in an integrated circuit (IC chip), or the like, or may be implemented by software.

In the latter case, the controllers 10, 11, 12, and 13 include a computer that executes an instruction of a program which is software for implementing functions. The computer includes, for example, one or more processors, and includes a computer readable recording medium in which the program is stored. Thus, in the computer, when the processor reads and executes the program from the recording medium, the above function of the disclosure is achieved. As the processor, for example, a central processing unit (CPU) can be used. As the recording medium, a "non-transitory tangible medium," for example, a tape, a disk, a card, a semiconductor memory, or a programmable logic circuit other than a read only memory (ROM) can be used. In addition, a random access memory (RAM) that opens the program may be further included. In addition, the program may be supplied to the computer through an arbitrary transmission medium (such as a communication network and broadcast waves) that can transmit the program. Here, an embodiment of the disclosure may be realized in the form of a data signal combined with carrier waves embodied according to electric transmission of the program.

The disclosure is not limited to the above embodiments, and various modifications can be made within the scope of the claims, and embodiments obtained by appropriately combining technical methods disclosed in different embodiments are included in the technical scope of the disclosure.

What is claimed is:

1. A control device comprising:
a first trajectory generation unit configured to generate a first command trajectory in which a high frequency component is removed from a reference trajectory in a manner without occurring phase delay as a command trajectory of a first servo control system;
a second trajectory generation unit configured to generate a second command trajectory including a trajectory corresponding to the high frequency component as a command trajectory of a second servo control system; and
a prediction unit configured to predict a response of the first servo control system corresponding to the first command trajectory using a dynamic characteristics model of the first servo control system,
wherein the prediction unit predicts a control amount which is an output of the first servo control system for a first command value generated from the first command trajectory using the dynamic characteristics model of the first servo control system, and
the control device comprises
an instruction unit configured to output the first command value corrected according to model predictive control using a control amount predicted by the prediction unit and a measured value of a control amount of the first servo control system acquired as feedback information from the first servo control system to the first servo control system.

2. The control device according to claim 1,
wherein the first trajectory generation unit performs low pass filter processing on the reference trajectory in both directions of a forward direction and a reverse direction of a time axis and generates the first command trajectory.

3. The control device according to claim 2,
wherein the first trajectory generation unit performs the low pass filter processing on the reference trajectory in order from the reverse direction to the forward direction of the time axis and generates the first command trajectory.

4. The control device according to claim 1,
wherein the first trajectory generation unit generates the first command trajectory from an average of upper and lower envelopes of a curve showing the reference trajectory.

5. The control device according to claim 1,
wherein the second trajectory generation unit generates the second command trajectory including a trajectory corresponding to an error between an intermediate trajectory and the reference trajectory, and wherein the intermediate trajectory is generated using a response of the first servo control system predicted by the prediction unit.

6. A method of controlling a control device comprising:
a first trajectory generation step of generating a first command trajectory in which a high frequency component is removed from a reference trajectory in a manner without occurring phase delay as a command trajectory of a first servo control system;
a second trajectory generation step of generating a second command trajectory including a trajectory corresponding to the high frequency component as a command trajectory of a second servo control system; and
a prediction step of predicting a response of the first servo control system corresponding to the first command trajectory using a dynamic characteristics model of the first servo control system, and a control amount which is an output of the first servo control system for a first command value generated from the first command trajectory using the dynamic characteristics model of the first servo control system, and
outputting the first command value corrected according to model predictive control using a control amount predicted by the prediction step and a measured value of a control amount of the first servo control system acquired as feedback information from the first servo control system to the first servo control system.

7. A computer readable recording medium storing an information processing program to render the computer to function as each of the units of the control device according to claim 1.

* * * * *